US012596474B2

(12) United States Patent
Muthiah

(10) Patent No.: US 12,596,474 B2
(45) Date of Patent: Apr. 7, 2026

(54) PEER CONFIGURATION OF COMPUTE RESOURCES AMONG DATA STORAGE DEVICES

(71) Applicant: Sandisk Technologies, Inc., Milpitas, CA (US)

(72) Inventor: Ramanathan Muthiah, Bangalore (IN)

(73) Assignee: Sandisk Technologies, Inc., Milpitas, CA (US)

( * ) Notice: Subject to any disclaimer, the term of this patent is extended or adjusted under 35 U.S.C. 154(b) by 2 days.

(21) Appl. No.: 18/753,323

(22) Filed: Jun. 25, 2024

(65) Prior Publication Data

US 2025/0390218 A1     Dec. 25, 2025

(51) Int. Cl.
G06F 3/06          (2006.01)

(52) U.S. Cl.
CPC .......... G06F 3/0607 (2013.01); G06F 3/0632 (2013.01); G06F 3/067 (2013.01)

(58) Field of Classification Search
CPC ...... G06F 3/0688; G06F 3/061; G06F 3/0659; G06F 3/0604; G06F 3/064; G06F 3/067; G06F 3/0689; G06F 11/1076; G06F 11/3058; G06F 11/3409; G06F 12/0238; G06F 12/0246; G06F 13/124; G06F 16/24553; G06F 16/24561; G06F 2212/7201; G06F 3/0607; G06F 3/0625; G06F 3/0626; G06F 3/0635; G06F 3/065; G06F 3/0656; G06F 3/0661; G06F 3/0679; G06F 9/485
See application file for complete search history.

(56) References Cited

U.S. PATENT DOCUMENTS

| | | | |
|---|---|---|---|
| 10,387,303 B2 | 8/2019 | Mehra | |
| 11,625,192 B2 * | 4/2023 | Muthiah | ................. G06F 9/485 |
| | | | 711/154 |
| 2022/0164299 A1 * | 5/2022 | Moshe | .................... G06F 21/44 |
| 2022/0300206 A1 * | 9/2022 | Furuta | ................... G06F 3/0683 |
| 2023/0418490 A1 | 12/2023 | Muthiah | |
| 2023/0418518 A1 | 12/2023 | Hahn | |

* cited by examiner

*Primary Examiner* — Yong J Choe

(74) *Attorney, Agent, or Firm* — Patent Law Works LLP

(57)          ABSTRACT
Example storage systems, storage devices, and methods provide peer configuration of hardware compute resources among peer storage devices. Data storage devices may include hardware circuits, such as graphics processor units, media processor circuits, compute accelerator circuits, and neural processing units, configured for compute operations targeting host data associated with that storage device. One of the storage devices is configured to act as a master storage device for determining firmware configurations for the other storage devices and sending an indication of the firmware image to be used for some operating period. The storage device receiving the firmware image loads the firmware image for the hardware circuit and reboots the hardware circuit to configure it with the firmware image.

20 Claims, 8 Drawing Sheets

300

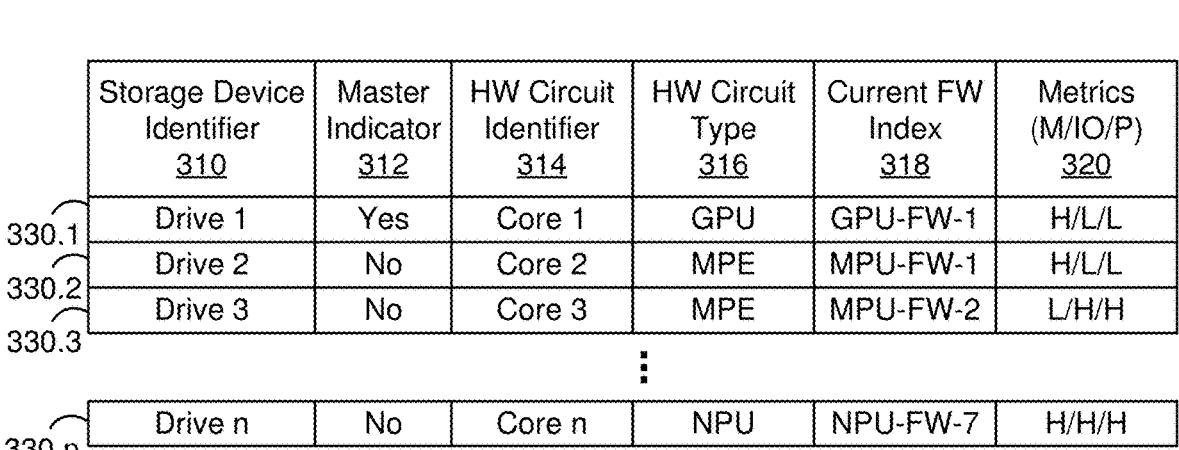

| Storage Device Identifier 310 | Master Indicator 312 | HW Circuit Identifier 314 | HW Circuit Type 316 | Current FW Index 318 | Metrics (M/IO/P) 320 |
|---|---|---|---|---|---|
| Drive 1 | Yes | Core 1 | GPU | GPU-FW-1 | H/L/L |
| Drive 2 | No | Core 2 | MPE | MPU-FW-1 | H/L/L |
| Drive 3 | No | Core 3 | MPE | MPU-FW-2 | L/H/H |
| Drive n | No | Core n | NPU | NPU-FW-7 | H/H/H |

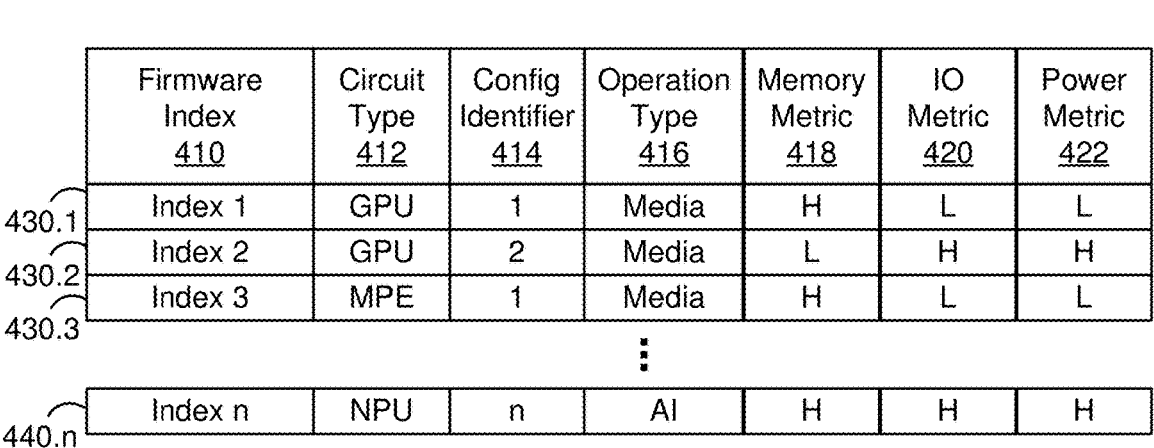

| Firmware Index 410 | Circuit Type 412 | Config Identifier 414 | Operation Type 416 | Memory Metric 418 | IO Metric 420 | Power Metric 422 |
|---|---|---|---|---|---|---|
| Index 1 | GPU | 1 | Media | H | L | L |
| Index 2 | GPU | 2 | Media | L | H | H |
| Index 3 | MPE | 1 | Media | H | L | L |
| Index n | NPU | n | AI | H | H | H |

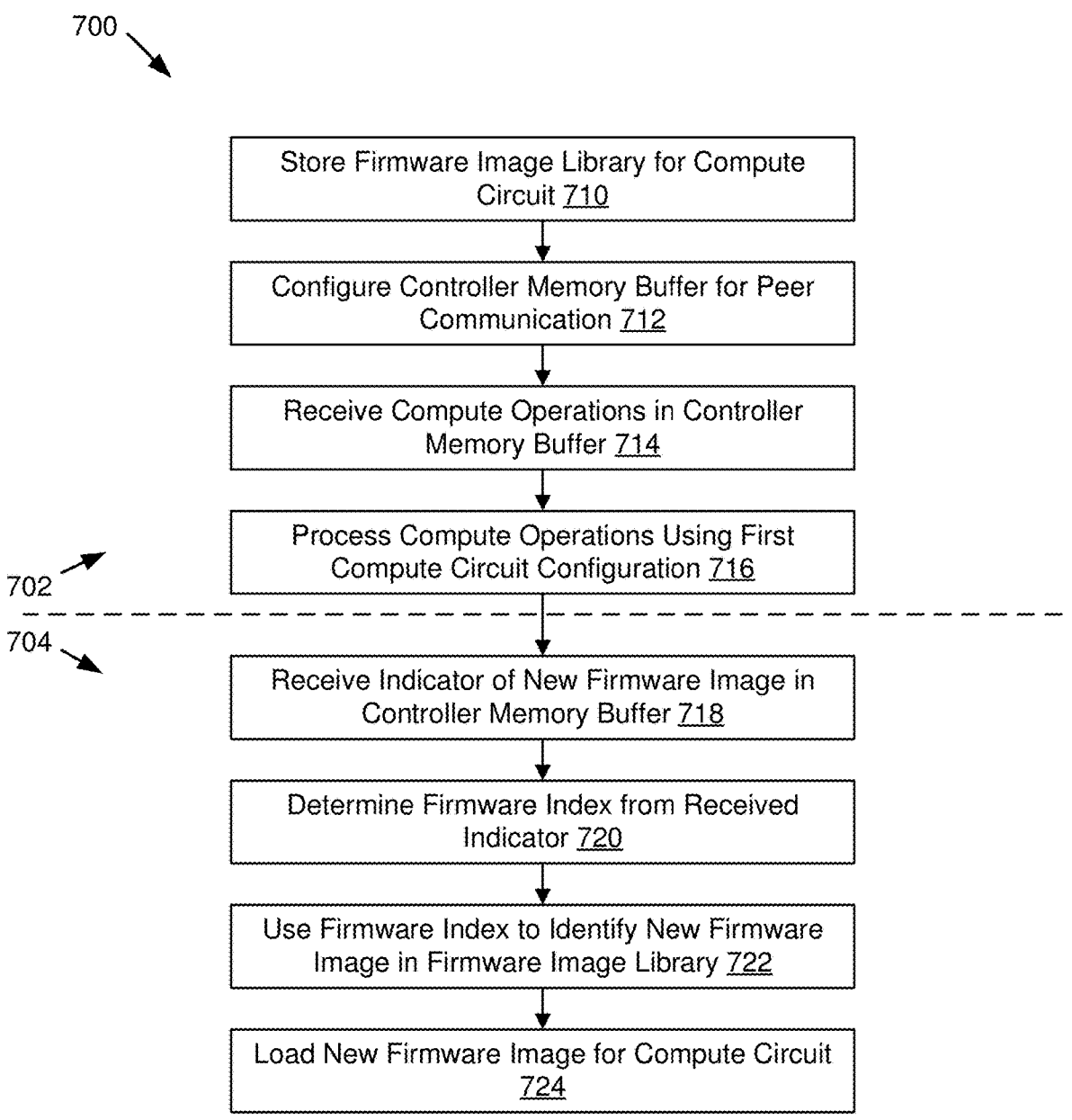

700

702

704

Store Firmware Image Library for Compute Circuit 710

Configure Controller Memory Buffer for Peer Communication 712

Receive Compute Operations in Controller Memory Buffer 714

Process Compute Operations Using First Compute Circuit Configuration 716

Receive Indicator of New Firmware Image in Controller Memory Buffer 718

Determine Firmware Index from Received Indicator 720

Use Firmware Index to Identify New Firmware Image in Firmware Image Library 722

Load New Firmware Image for Compute Circuit 724

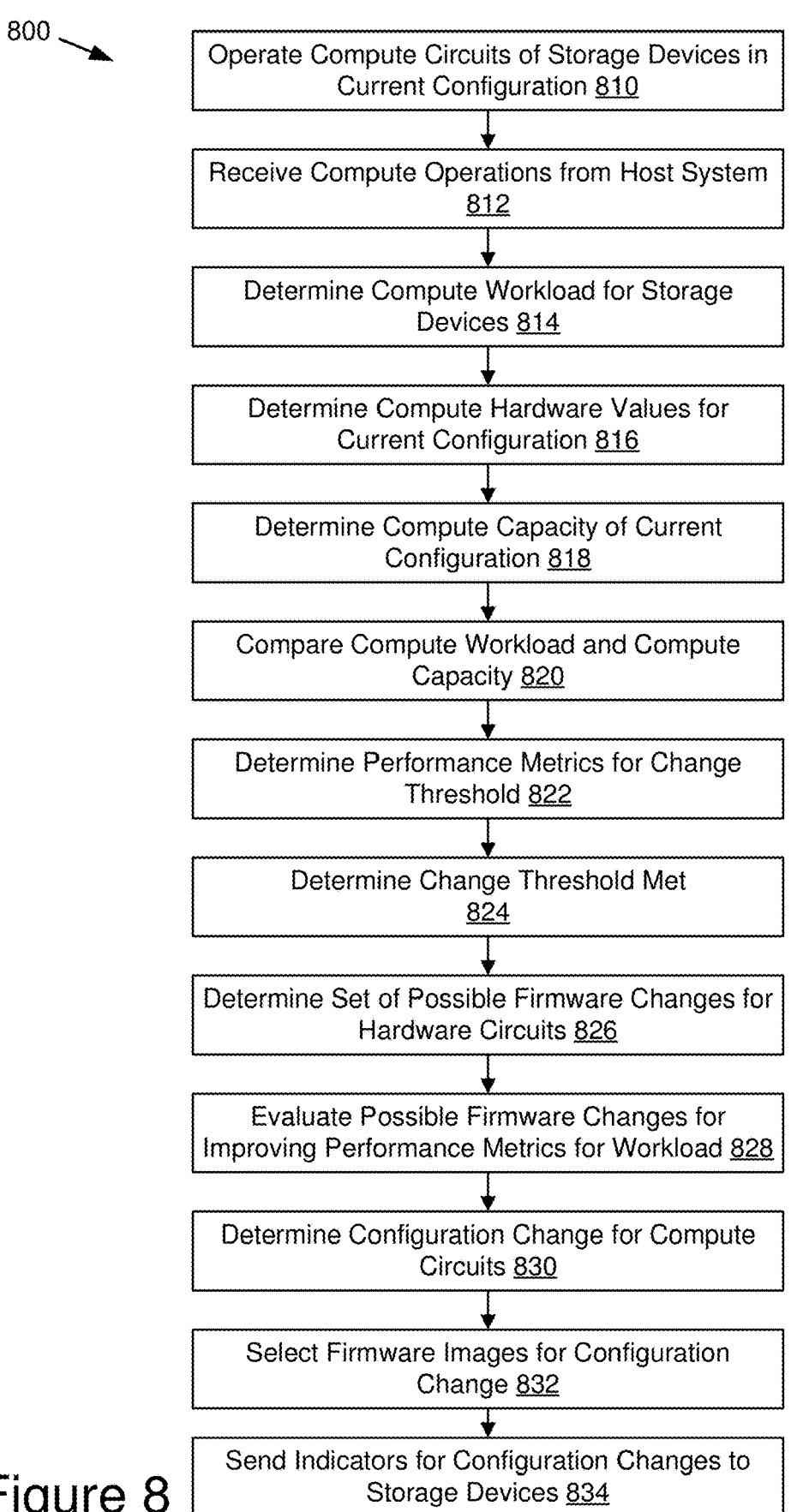

Operate Compute Circuits of Storage Devices in Current Configuration 810

Receive Compute Operations from Host System 812

Determine Compute Workload for Storage Devices 814

Determine Compute Hardware Values for Current Configuration 816

Determine Compute Capacity of Current Configuration 818

Compare Compute Workload and Compute Capacity 820

Determine Performance Metrics for Change Threshold 822

Determine Change Threshold Met 824

Determine Set of Possible Firmware Changes for Hardware Circuits 826

Evaluate Possible Firmware Changes for Improving Performance Metrics for Workload 828

Determine Configuration Change for Compute Circuits 830

Select Firmware Images for Configuration Change 832

Send Indicators for Configuration Changes to Storage Devices 834

Figure 8

PEER CONFIGURATION OF COMPUTE RESOURCES AMONG DATA STORAGE DEVICES

TECHNICAL FIELD

The present disclosure generally relates to data storage devices with onboard compute processing hardware, more particularly, to peer storage devices managing the firmware configurations of those hardware compute resources.

BACKGROUND

In the field of data storage and computation, solid state drives (SSDs) are commonly used due to their high-speed data access and reliability. These SSDs often incorporate various types of hardware cores, such as accelerator cores, field programmable gate array (FPGA) circuits, graphics processing unit (GPU) cores, and other specialized compute hardware in their controller system on chips (SoCs) to perform computations related to the data stored in or being stored to their non-volatile storage media. The performance of these computations can vary based on the configuration of the cores with firmware (FW).

Different types of hardware, such as media processing engines (MPE), neural processing units (NPUs), FPGAs, GPUs, central processing units (CPUs), and other hardware compute circuits are used for different computational tasks. Each of these hardware systems can be configured with different firmware to produce an output with different memory use, input/output (I/O), power usage, and types of supported operations to support expected Quality of Service (QOS) requirements for the SSD or overall storage system. However, one of the challenges in the compute SSD environment is to minimize data movement and perform quick computations. This requires associating the data in accordance with the requirements, which can be a complex task and may be improved by dynamic reconfiguration of compute resources over time.

Therefore, there still exists a need for a system that can dynamically reconfigure compute resources in SSDs to optimize data movement and computation performance based on the specific requirements of the data. Storage systems that can manage dynamic reconfiguration of compute resources among data storage devices without host or administrator intervention may be desirable.

SUMMARY

Various aspects for a storage system that dynamically reconfigures compute resources in peer data storage devices, such as SSDs configured for peer communication, are described. More particularly, the system involves a master storage device configuring the compute cores associated with peer storage devices in the network with different compute firmware for their respective compute cores. Each compute firmware image is targeted to suit a specific type of computation based on the application requirements and various performance metrics that can be aggregated to manage the overall compute capacity of the system, as well as the compute capabilities of individual storage devices. The master storage device may also manage and route storage and compute operations to multiple peer storage devices, based on the policy that a specific computational demand of the routed data matches the compute expertise offered by an individual storage device.

One general aspect includes a data storage device that includes a non-volatile storage medium configured to store host data; at least one storage interface configured for communication with a host system and a plurality of peer storage devices, where each peer storage device of the plurality of peer storage devices includes a hardware circuit configured for compute operations targeting host data in that peer storage device; and at least one processor. The at least one processor is configured to, alone or in combination: determine a target peer storage device from the plurality of peer storage devices; determine a first firmware image for the hardware circuit of the target peer storage device; and send an indication of the first firmware image to the target peer storage device, where the target peer storage device is configured to use the first firmware image to configure the hardware circuit.

Implementations may include one or more of the following features. The data storage device may include a remotely accessible buffer memory configured for access by the plurality of peer storage devices through the at least one storage interface, where: the plurality of peer storage devices each include a remotely accessible buffer memory configured for access by the at least one processor; and sending the indication of the first firmware image to the target peer storage device includes transferring the indication to the remotely accessible buffer memory of the target peer storage device. The indication of the first firmware image may be a firmware index for the first firmware image and the target peer storage device may be further configured to: store, prior to receiving the indication, a firmware image library including the first firmware image; and load, responsive to receiving the indication, the first firmware image for the hardware circuit from the firmware image library. The indication of the first firmware image may include a copy of the first firmware image and the at least one processor may be further configured to, alone or in combination: determine a desired configuration for the hardware circuit of the target peer storage device; select the first firmware image corresponding to the desired configuration from a firmware library may include of a plurality of firmware images for the hardware circuit; and copy the first firmware image from the firmware library to the remotely accessible buffer memory of the target peer storage device. The target peer storage device may be further configured to operate, prior to receiving the indication of the first firmware image, the hardware circuit using a second firmware image that is different than the first firmware image. The at least one processor may be further configured to, alone or in combination: receive, from the host system, a plurality of compute operations targeting host data in the plurality of peer storage devices; and select, based on the plurality of compute operations, the first firmware image. The at least one processor may be further configured to, alone or in combination: determine, based on the plurality of compute operations, a compute workload for the plurality of peer storage devices; determine, based on current configurations for the hardware circuits of the plurality of peer storage devices, a compute capacity; determine, based on a comparison of the compute workload and the compute capacity, at least one configuration change for the plurality of peer storage devices; and send, to the plurality of peer storage devices, at least one firmware image indicator for a firmware change for at least one hardware circuit of the plurality of peer storage devices. The at least one processor may be further configured to, alone or in combination: determine, based on the current configurations for the hardware circuits of the plurality of peer storage devices and for each hardware circuit, at least one value selected from an operation support type, a memory usage metric, an operations per unit time metric, and a power metric; determine, for each hardware circuit, a plurality of possible firmware images corresponding to different values for the at least one value; and select, based on the plurality of possible firmware images, the firmware change. The data storage device may include a peer compute management data structure stored in memory and comprising, for each peer storage device of the plurality of peer storage devices, a storage device identifier; at least one hardware circuit identifier; at least one hardware circuit type; and at least one current firmware index. The at least one hardware circuit identifier may be configured to uniquely identify at least one hardware circuit configured for compute operations in that peer storage device; the at least one hardware circuit type may be configured to identify among a plurality of hardware circuit types for each at least one hardware circuit identifier; and the at least one current firmware index may be configured to identify among a plurality of firmware images for that hardware circuit type. The at least one processor may be further configured to, alone or in combination: receive, from the host system, a plurality of compute operations targeting host data in the plurality of peer storage devices; and select, for each compute operation of the plurality of compute operations and based on current configurations of the hardware circuits in the plurality of peer storage devices, a destination peer storage device for executing that compute operation using the hardware circuit of that destination peer storage device. The at least one processor may include: a first processor core configured to execute compute management functions; a second processor core configured to execute storage operations to the non-volatile storage medium; and a third processor core configured to execute compute operations related to host data stored in the non-volatile storage medium, where the third processor core is at least a portion of a hardware circuit selected from: a compute accelerator circuit; a field programmable gate array circuit; a graphics processing unit circuit; a media processing engine circuit; and a neural processing unit circuit.

Another general aspect includes a computer-based method that includes determining, by a master storage device, a target peer storage device from a plurality of peer storage devices, where each storage device of the master storage device and the plurality of peer storage devices includes: a non-volatile storage medium configured to store host data for a host system; at least one storage interface configured for communication among the master storage device and the plurality of peer storage devices; and a hardware circuit configured for compute operations targeting host data for that storage device. The method also includes: determining, by the master storage device, a first firmware image for the hardware circuit of the target peer storage device; sending, by the master storage device, an indication of the first firmware image to the target peer storage device; and loading, by the target peer storage device, the first firmware image to configure the hardware circuit with the first firmware image.

Implementations may include one or more of the following features. Each storage device of the master storage device and the plurality of peer storage devices may include a remotely accessible buffer memory configured for access among the master storage device and the plurality of peer storage devices through the at least one storage interface of that storage device; and sending the indication of the first firmware image to the target peer storage device may include the master storage device transferring the indication to the remotely accessible buffer memory of the target peer storage device. The computer-based method may include: storing, by the target peer storage device and prior to receiving the indication, a firmware image library including the first firmware image; and determining, by the target peer storage device, a firmware index for the first firmware image from the indication of the first firmware image, where loading the first firmware image for the hardware circuit may include loading the first firmware image from the firmware image library. The computer-based method may include: determining, by the master storage device, a desired configuration for the hardware circuit of the target peer storage device; selecting, by the master storage device, the first firmware image corresponding to the desired configuration from a firmware library comprised of a plurality of firmware images for the hardware circuit; and copying, by the master storage device, the first firmware image from the firmware library to the remotely accessible buffer memory of the target peer storage device, where the indication of the first firmware image may include a copy of the first firmware image. The computer-based method may include: operating, by the target peer storage device and prior to receiving the indication of the first firmware image, the hardware circuit using a second firmware image that is different than the first firmware image; receiving, from the host system, a plurality of compute operations targeting host data in the plurality of peer storage devices; and selecting, by the master storage device and based on the plurality of compute operations, the first firmware image for the hardware circuit of the target peer storage device. The computer-based method may include: determining, by the master storage device and based on the plurality of compute operations, a compute workload for the plurality of peer storage devices; determining, by the master storage device and based on current configurations for the hardware circuits of the plurality of peer storage devices, a compute capacity; determining, by the master storage device and based on a comparison of the compute workload and the compute capacity, at least one configuration change for the plurality of peer storage devices; and sending, by the master storage device and to the plurality of peer storage devices, at least one firmware image indicator for a firmware change for at least one hardware circuit of the plurality of peer storage devices. The computer-based method may include: determining, by the master storage device and based on the current configurations for the hardware circuits of each storage device of the plurality of peer storage devices, at least one value for each hardware circuit, the at least one value selected from an operation support type, a memory usage metric, an operations per unit time metric, and a power metric; determining, by the master storage device and for each hardware circuit, a plurality of possible firmware images corresponding to different values for the at least one value; and selecting, by the master storage device and based on the plurality of possible firmware images, the firmware change. The computer-based method may include storing, by the master storage device, a peer compute management data structure comprising, for each storage device of the plurality of peer storage devices, a storage device identifier; at least one hardware circuit identifier; at least one hardware circuit type; and at least one current firmware index. The at least one hardware circuit identifier may be configured to uniquely identify at least one hardware circuit configured for compute operations in that peer storage device; the at least one hardware circuit type may be configured to identify among a plurality of hardware circuit types for each at least one hardware circuit identifier; and the at least one current firmware index may be configured to identify among a plurality of firmware images for that hardware circuit type. The computer-based method may include: receiving, by the master storage device and from the host system, a plurality of compute operations targeting host data in the plurality of peer storage devices; selecting, for each compute operation of the plurality of compute operations and based on current configurations of the hardware circuits in the plurality of peer storage devices, a destination peer storage device; and executing, by each destination peer storage device, that compute operation of the plurality of compute operations using the hardware circuit of that destination peer storage device.

Still another general aspect includes a system that includes a plurality of peer storage devices, where each storage device of the plurality of peer storage devices includes: a non-volatile storage medium configured to store host data for a host system; at least one storage interface configured for communication among the plurality of peer storage devices; and a hardware circuit configured for compute operations targeting host data for that storage device. The system also includes: means for determining, by a master storage device of the plurality of peer storage devices, a target peer storage device from the plurality of peer storage devices; means for determining, by the master storage device, a first firmware image for the hardware circuit of the target peer storage device; and means for sending, by the master storage device, an indication of the first firmware image to the target peer storage device, where the target peer storage device is configured to use the first firmware image to configure the hardware circuit.

The various embodiments advantageously apply the teachings of distributed storage networks and/or systems to improve the functionality of such computer systems. The various embodiments include operations to overcome or at least reduce the issues in the previous storage networks and/or systems discussed above and, accordingly, are more reliable and/or efficient than other computing networks. That is, the various embodiments disclosed herein include hardware and/or software with functionality to improve the efficient processing of data compute functions be executing those functions using distributed peer storage devices with compute hardware configurations managed by a master storage device. Accordingly, the embodiments disclosed herein provide various improvements to storage networks and/or storage systems.

It should be understood that language used in the present disclosure has been principally selected for readability and instructional purposes, and not to limit the scope of the subject matter disclosed herein.

BRIEF DESCRIPTION OF THE DRAWINGS

FIG. 3 depicts an example table data structure for managing firmware configurations for compute hardware circuits among peer storage devices.

FIG. 4 depicts an example table data structure for managing the metadata for a firmware image library for configuring compute hardware circuits among peer storage devices.

6

Figure 6:
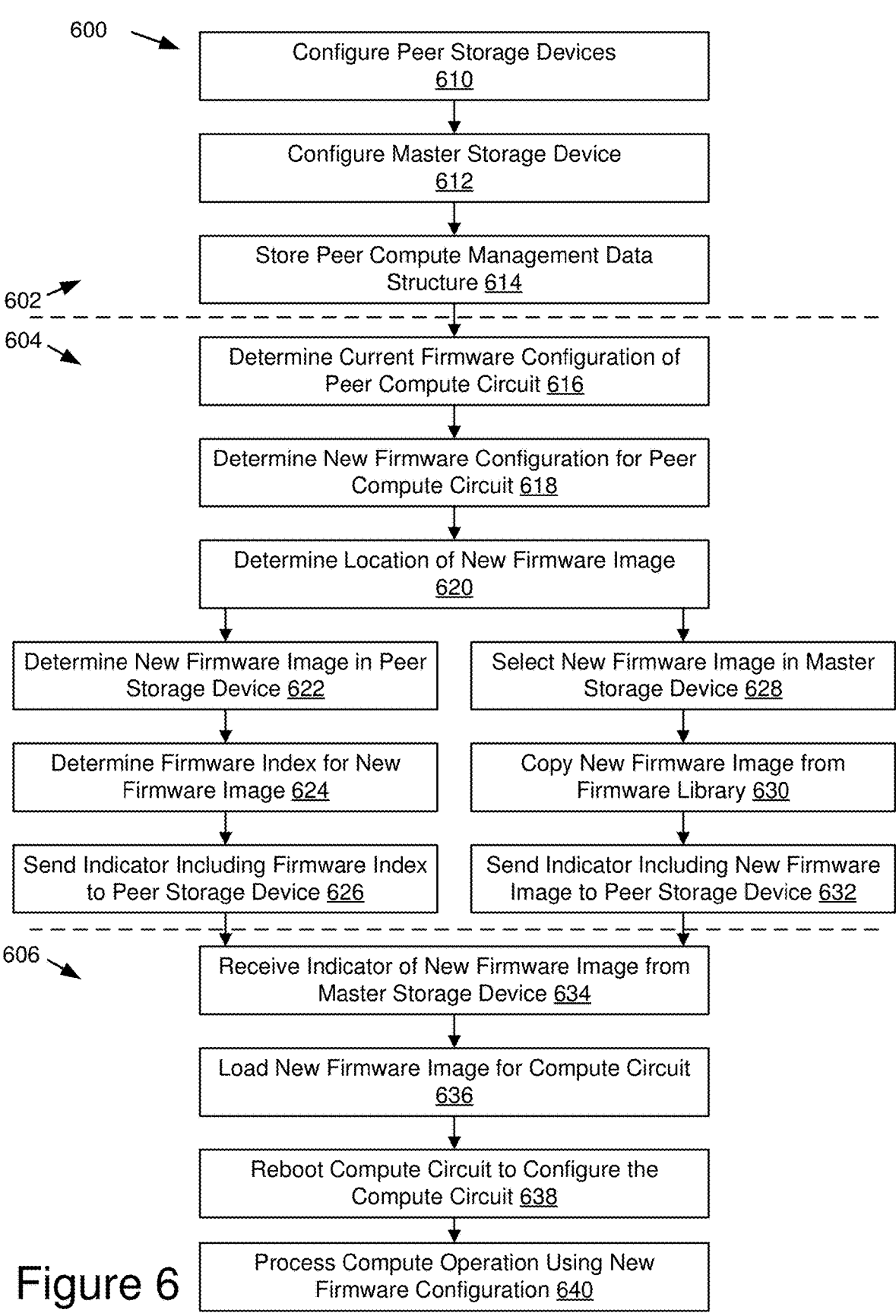

FIG. 6 is a flowchart of an example method for configuring and managing compute firmware in peer storage devices.

FIG. 7 is a flowchart of an example method for managing firmware in compute circuits of a storage device in response to an indication to change firmware.

FIG. 8 is a flowchart of an example method for managing compute circuits of peer storage devices based on compute operations from a host system.

Figure 9:
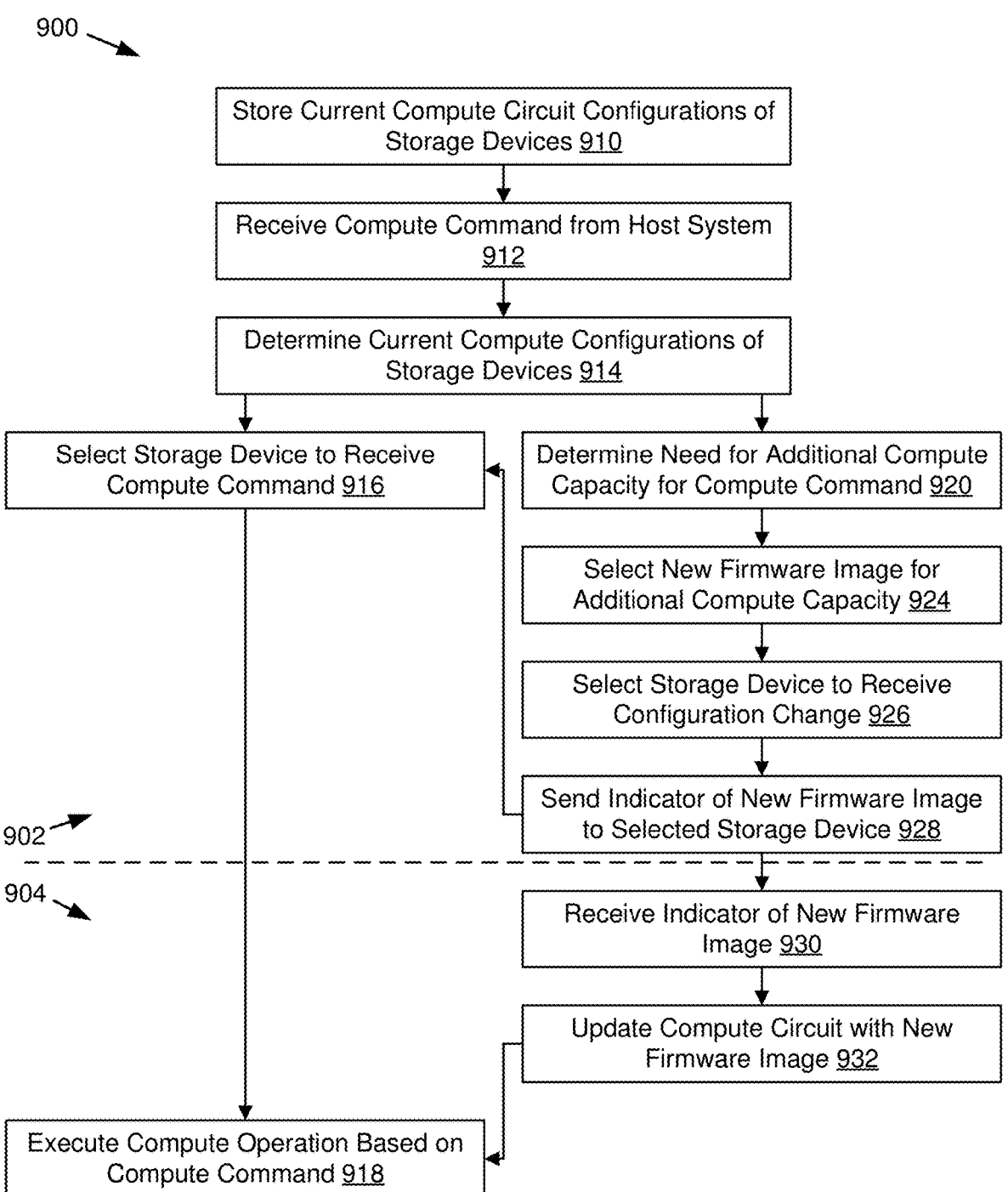

FIG. 9 is a flowchart of an example method for managing compute operations of peer storage devices based on supporting a compute command from a host system.

DETAILED DESCRIPTION

The present disclosure provides a system for dynamic reconfiguration of compute resources in peer data storage devices, such as SSDs configured for peer communication, to optimize data movement and computation performance. This system may involve a master storage device that configures the compute cores associated with individual storage devices in a network through a controller memory buffer (CMB) with different compute firmware. Each compute firmware image may be tailored to suit a specific type of computation based on the application requirements. The individual storage devices may then be configured to reboot the compute cores with the new firmware in line with these requirements.

In addition, the master storage device may manage and route data to multiple peer storage devices, based on a policy that matches the specific computational requirements of the routed data with the compute expertise offered by individual storage devices (based on a current or updated firmware configuration). This expertise may be due to different hardware and firmware configurations. The master storage device may configure other storage device compute hardware circuits through various means, such as indicating a firmware index that requires loading or broadcasting an updated firmware binary.

The master storage device may create and manage a peer compute management table or similar data structure to track the expertise of each storage device, which enables it to determine what type of effective and faster computations each storage device can perform. The master storage device may also track the performance metrics, such as memory use, I/O operations per unit time, and power consumption, of each hardware circuit configuration in the same table. In this environment, the master storage device may abstract other storage devices from the host system and acts as a point of contact for all storage devices, while the individual storage devices provide specific expertise. The master storage device may then route different data to different SSDs based on computational requirements.

In some cases, the master storage device may hint other storage devices to dynamically load a specific firmware image to their compute cores, among a plurality of firmware images available in its flash, to optimize in-device computation of the data. The master storage device may also configure some storage devices as general-purpose compute and storage devices by utilizing existing on-board processing (such as one or more device controller CPU cores), enabling backward compatibility to storage devices that lack the specialized hardware circuits to perform a specific computation.

In a broader version of the system, the storage devices themselves may each have different types of hardware circuits for supporting host compute functions. For example, some compute SSDs could have a compute accelerator circuit, graphics processing unit (GPU), media processing engine (MPE), neural processing unit (NPU), or field-programmable gate array (FPGA) integrated into their application-specific integrated circuit (ASIC) or system-on-a-chip (SoC).

In some cases, the master storage device may make data routing decisions based on the computation workload and/or storage I/O workload in each storage device. For example, if a storage device is overloaded with computations in a queue beyond a threshold, the master storage device may consider routing data to another storage device, which it deems the next-best fit according to its compute configuration and/or may be reconfigured to support the computation overflow. For example, a storage device with available capacity and compute hardware compatible with the computation type may be dynamically reconfigured by the master storage device sending an indication to change firmware and the target storage device loading the corresponding firmware image to update the hardware circuit operations for the incoming compute operations. During data routing, the master storage device may also manage both compute and storage obligations by trading off some aspects for the sake of SSD wear leveling and load balancing.

Figure 1:
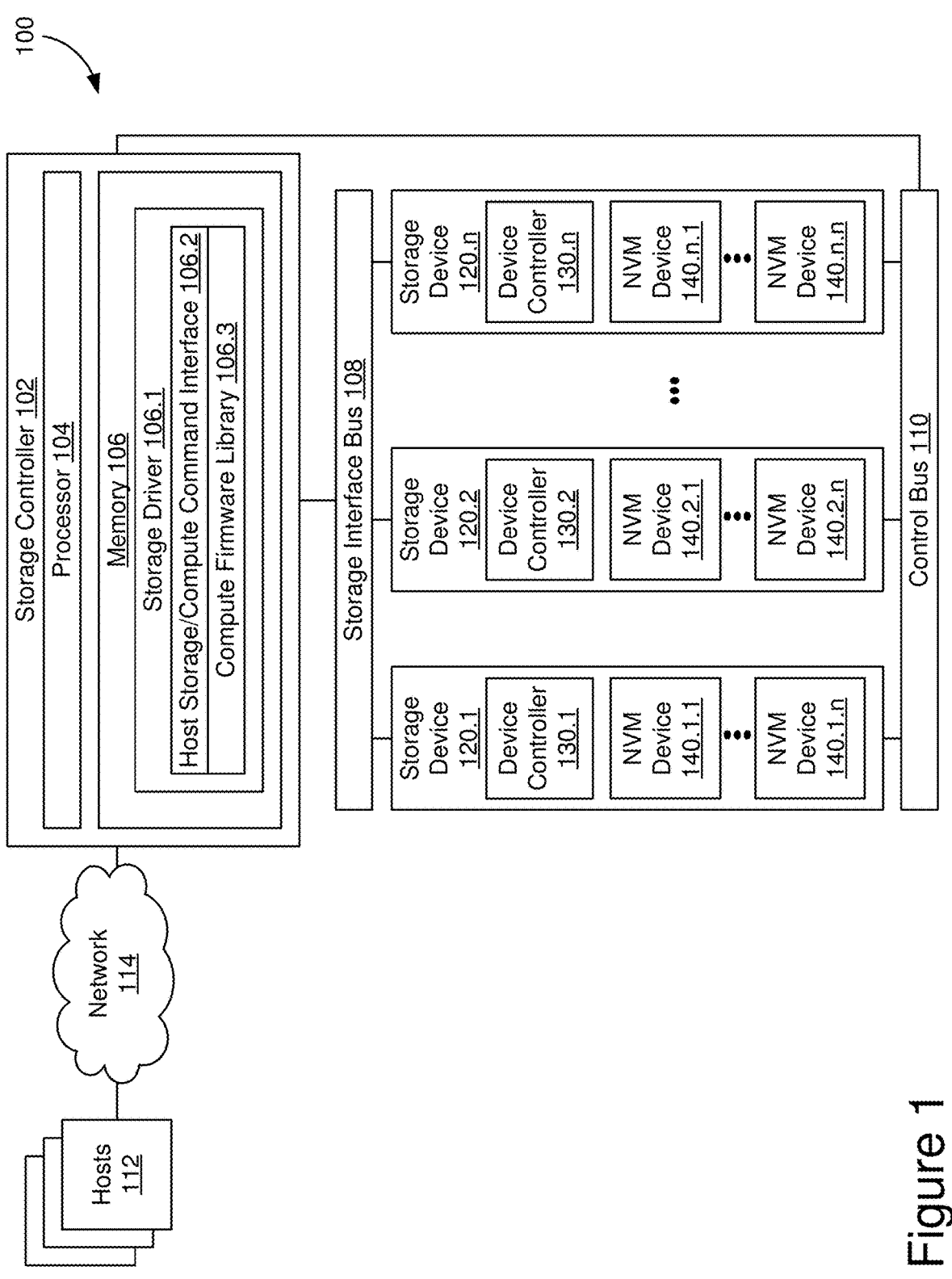
FIG. 1 schematically illustrates an example storage system with multiple storage devices.

FIG. 1 shows an embodiment of an example data storage system 100 with multiple data storage devices 120 supporting a plurality of host systems 112 through storage controller 102. While some example features are illustrated, various other features have not been illustrated for the sake of brevity and so as not to obscure pertinent aspects of the example embodiments disclosed herein. To that end, as a non-limiting example, data storage system 100 may include one or more data storage devices 120 (also sometimes called information storage devices, storage devices, disk drives, or drives) configured in a storage node with storage controller 102. In some embodiments, storage devices 120 may be configured in a server, storage array blade, all flash array appliance, just-a-bunch-of-flash (JBOF) enclosure, or similar storage unit for use in data center storage racks or chassis. Storage devices 120 may interface with one or more host nodes or host systems 112 and provide both data storage and retrieval capabilities and compute functions operating on host data stored or retrieved from those storage devices or through those host systems. In some embodiments, storage devices 120 may be configured in a storage hierarchy that includes storage nodes, storage controllers (such as storage controller 102), and/or other intermediate components between storage devices 120 and host systems 112. For example, each storage controller 102 may be responsible for a corresponding set of storage devices 120 in a storage node and their respective storage devices may be connected through a corresponding backplane network or internal bus architecture including storage interface bus 108 and/or control bus 110, though only one instance of storage controller 102 and corresponding storage node components are shown. In some embodiments, storage controller 102 may include or be configured within a host bus adapter, bridge device, storage interface card, or other device for connecting storage devices 120 to fabric network 114 for communication with host systems 112. In some configurations, storage controller 102 and/or some or all functions of storage controller 102 may be integrated into host systems 112 and/or a master data storage device in a peer storage configuration for direct interface between host systems 112 and storage devices 120.

In the embodiment shown, a number of storage devices 120 are attached to a common storage interface bus 108 for host communication through storage controller 102. For example, storage devices 120 may include a number of drives arranged in a storage array, such as storage devices sharing a common rack, unit, or blade in a data center or the SSDs in an all flash array. In some embodiments, storage devices 120 may share a backplane network, network switch (es), and/or other hardware and software components accessed through storage interface bus 108 and/or control bus 110. For example, storage devices 120 may connect to storage interface bus 108 and/or control bus 110 through a plurality of physical port connections that define physical, transport, and other logical channels for establishing communication with the different components and subcomponents for establishing a communication channel to host 112. In some embodiments, storage interface bus 108 may provide the primary host interface for storage device management and host data transfer, and control bus 110 may include limited connectivity to the host for low-level control functions.

In some embodiments, storage devices 120 may be referred to as a peer group or peer storage devices because they are interconnected through storage interface bus 108 and/or control bus 110. In some embodiments, storage devices 120 may be configured for peer communication among storage devices 120 through storage interface bus 108, with or without the assistance of storage controller 102 and/or host systems 112. For example, storage devices 120 may be configured for direct memory access using one or more protocols, such as non-volatile memory express (NVMe), remote direct memory access (RDMA), NVMe over fabric (NVMeOF), etc., to provide command messaging and data transfer between storage devices using the high-bandwidth storage interface and storage interface bus 108.

In some embodiments, data storage devices 120 are, or include, solid-state drives (SSDs). Each data storage device 120.1-120.$n$ may include a non-volatile memory (NVM) or device controller 130 based on compute resources (processor and memory) and a plurality of NVM or media devices 140 to provide a non-volatile storage medium for data storage (e.g., one or more NVM device(s), such as one or more flash memory devices). In some embodiments, a respective data storage device 120 of the one or more data storage devices includes one or more NVM controllers, such as flash controllers or channel controllers (e.g., for storage devices having NVM devices in multiple memory channels). In some embodiments, data storage devices 120 may each be packaged in a housing, such as a multi-part sealed housing with a defined form factor and ports and/or connectors for interconnecting with storage interface bus 108 and/or control bus 110.

In some embodiments, a respective data storage device 120 may include a single medium device while in other embodiments the respective data storage device 120 includes a plurality of media devices. In some embodiments, media devices include NAND-type flash memory or NOR-type flash memory. In some embodiments, data storage device 120 may include one or more hard disk drives (HDDs). In some embodiments, data storage devices 120 may include a flash memory device, which in turn includes one or more flash memory die, one or more flash memory packages, one or more flash memory channels or the like. However, in some embodiments, one or more of the data storage devices 120 may have other types of non-volatile data storage media (e.g., phase-change random access memory (PCRAM), resistive random access memory (Re- RAM), spin-transfer torque random access memory (STT-RAM), magneto-resistive random access memory (MRAM), etc.).

In some embodiments, each storage device 120 includes a device controller 130, which includes one or more processing units (also sometimes called central processing units (CPUs), processors, microprocessors, or microcontrollers) configured to execute instructions in one or more programs. In some embodiments, the one or more processors are shared by one or more components within, and in some cases, beyond the function of the device controllers. In some configurations, multiple processors or processor cores may operate alone or in combination to execute the functions of device controller 130. In some embodiments, device controllers 130 may include firmware for controlling data written to and read from media devices 140, one or more storage (or host) interface protocols for communication with other components, as well as various internal functions, such as garbage collection, wear leveling, media scans, and other memory and data maintenance. For example, device controllers 130 may include firmware for running the NVM layer of an NVMe storage protocol alongside media device interface and management functions specific to the storage device. In some configurations, device controllers 130 may include or interface with compute hardware circuits that augment the general data processing capabilities of the device controller processor. For example, device controllers 130 may include one or more compute cores comprising hardware circuits specialized for specific data processing computations, such as compute accelerator circuits, GPUs, MPEs, NPUs, or FPGAs. Media devices 140 are coupled to device controllers 130 through connections that typically convey commands in addition to data, and optionally convey metadata, error correction information and/or other information in addition to data values to be stored in media devices and data values read from media devices 140. Media devices 140 may include any number (i.e., one or more) of memory devices including, without limitation, non-volatile semiconductor memory devices, such as flash memory device(s).

In some embodiments, media devices 140 in storage devices 120 are divided into a number of addressable and individually selectable blocks, sometimes called erase blocks. In some embodiments, individually selectable blocks are the minimum size erasable units in a flash memory device. In other words, each block contains the minimum number of memory cells that can be erased simultaneously (i.e., in a single erase operation). Each block is usually further divided into a plurality of pages and/or word lines, where each page or word line is typically an instance of the smallest individually accessible (readable) portion in a block. In some embodiments (e.g., using some types of flash memory), the smallest individually accessible unit of a data set, however, is a sector or codeword, which is a subunit of a page. That is, a block includes a plurality of pages, each page contains a plurality of sectors or codewords, and each sector or codeword is the minimum unit of data for reading data from the flash memory device.

A data unit may describe any size allocation of data, such as host block, data object, sector, page, multi-plane page, erase/programming block, media device/package, etc. In some configurations, the data unit may be the value portion of a key-value pair, where hosts 112 may define a key and provide a corresponding data unit of unstructured data (from a storage device perspective) having a memory size selected by the host. Storage devices 120 may store the key as a unique index value and map storage locations meeting the memory size in NVM devices 140 for storing the data unit. Storage locations may include physical and/or logical locations on storage devices 120 and may be described and/or allocated at different levels of granularity depending on the storage medium, storage device/system configuration, and/or context. For example, the storage device may manage the variable sizes of key-value pairs by allocating appropriately sized storage locations mapped to the particular key for addressability for host read/write purposes but managed as pages within storage device addressing managed in the media flash translation layer (FTL) in other contexts. Media segments may include physical storage locations on storage devices 120, which may also correspond to one or more logical storage locations. In some embodiments, media segments may include a continuous series of physical storage location, such as adjacent data units on a storage medium, and, for flash memory devices, may correspond to one or more media erase or programming blocks.

In some embodiments, storage controller 102 may be coupled to data storage devices 120 through a network interface that is part of host fabric network 114 and includes storage interface bus 108 as a host fabric interface. In some embodiments, host systems 112 are coupled to data storage system 100 through network 114 and storage controller 102 may include a storage network interface, host bus adapter, bridge device, initiator card, or other interface capable of supporting communications with multiple host systems 112. Network 114 may include a wired and/or wireless network (e.g., public and/or private computer networks in any number and/or configuration) which may be coupled in a suitable way for transferring data. For example, the fabric network may include any means of a conventional data communication network such as a local area network (LAN), a wide area network (WAN), a telephone network, such as the public switched telephone network (PSTN), an intranet, the internet, or any other suitable communication network or combination of communication networks. From the perspective of storage devices 120, storage interface bus 108 may be referred to as a host interface bus and provides a host data path between storage devices 120 and host systems 112, through storage controller 102 and/or an alternative interface to fabric network 114.

Host systems 112, or a respective host in a system having multiple hosts, may be any suitable computer device, such as a computer, a computer server, a laptop computer, a tablet device, a netbook, an internet kiosk, a personal digital assistant, a mobile phone, a smart phone, a gaming device, or any other computing device. Host systems 112 are sometimes called a host, client, or client system. In some embodiments, host systems 112 are server systems, such as a server system in a data center. In some embodiments, the one or more host systems 112 are one or more host devices distinct from a storage node housing the plurality of storage devices 120 and/or storage controller 102. In some embodiments, host systems 112 may include a plurality of host systems owned, operated, and/or hosting applications belonging to a plurality of entities and supporting one or more quality of service (QOS) standards for those entities and their applications. Host systems 112 may be configured to store and access data in the plurality of storage devices 120 in a multi-tenant configuration with shared storage resource pools, such as host connections to namespaces defined in storage devices 120. In some configurations, host systems 112 may generate both storage I/O commands and compute function commands that indicate compute operations, such as data conversions, transformations, neural network processing or training, or other specialized data compute functions that are supported by the hardware of storage devices 120 and enable on-board compute processing in storage devices 120 to limit data movement for processing. For example, the compute commands may accompany storage operations/commands and/or target host data previously stored to storage devices 120 such that the compute function may be completed and the processed data returned or stored with reduced data movement across storage interface bus 108 and/or through storage controller 102, network 114, and/or hosts 112.

Storage controller 102 may include one or more central processing units (CPUs) or processors 104 for executing compute operations, storage management operations, and/or instructions for accessing storage devices 120 through storage interface bus 108. In some embodiments, processors 104 may include a plurality of processor cores which may be assigned or allocated to parallel processing tasks and/or processing threads for different storage operations and/or host storage connections. The processors or processor cores may be configured to operate alone or in combination to execute the functions of storage controller 102. In some embodiments, processor 104 may be configured to execute a fabric interface for communications through fabric network 114 and/or storage interface protocols for communication through storage interface bus 108 and/or control bus 110. In some embodiments, a separate network interface unit and/or storage interface unit (not shown) may provide the network interface protocol and/or storage interface protocol and related processor and memory resources.

Storage controller 102 may include a memory 106 configured to support a storage interface controller, such as NVMeoF controllers, that control communication between hosts 112 and storage devices 120 in accordance with a corresponding storage interface protocol. For example, storage controller 102 may support a plurality of namespaces allocated in storage devices 120 and manage access from hosts 112 through host connections to command queues allocated in storage devices 120. In some embodiments, memory 106 may include one or more dynamic random access memory (DRAM) devices for use by storage devices 120 for command, management parameter, and/or host data storage and transfer to support namespaces or other logical configurations of host data in storage devices 120. In some embodiments, storage devices 120 may be configured for direct memory access (DMA), such as using remote direct memory access (RDMA) protocols, over storage interface bus 108.

In some configurations, memory 106 may include a storage driver 106.1 configured to control one or more interfaces and corresponding functions to storage devices 120. For example, storage driver 106.1 may be configured to manage host compute operations and host storage operations, in addition to storage device management functions, to storage devices 120 through storage interface bus 108 and/or control bus 110. In some configurations, storage driver 106.1 may include host storage/compute command interface 106.2 configured to direct host storage and/or compute commands to storage devices 120. For example, storage driver 106.1 may support one or more storage protocols that use storage interface bus 108 to send host commands to target storage devices among storage devices 120 for desired storage or compute operations, such as directing host commands to command queues corresponding to host connections through storage controller 102. In some configurations, one storage device of storage devices 120 may be configured as a master storage device for receiving and redirecting host commands, as will be further described below, and host storage/compute command interface 106.2 may designate that master storage device and direct incoming host commands to that storage device.

In some configurations, storage driver 106.1 may support a variety of storage devices and, more specifically, a variety of hardware compute configurations among connected storage devices. For example, as storage devices of different types (manufacturer, capacity, configuration, etc.) are added among storage devices 120, storage driver 106.1 may include or be updated with corresponding interface drivers and firmware libraries to support those storage devices. These firmware libraries may include multiple firmware images for each storage device and/or for specific hardware circuits within those storage devices organized as a compute firmware library 106.3. For example, storage devices that include a GPU compute core may be supported by a set of firmware images for different configurations of their GPU compute core to support different compute operation types and/or various performance and resource optimizations for supporting those operation types. Each storage device may include a default firmware image that is initially compiled to establish the operations of the compute core. Compute firmware library 106.3 may include multiple images for that compute core that include different compiler optimizations. For example, a compiler optimization to reduce the size of the code and execution time of the compute function or algorithm may require more data and, thus, more memory to run the same computation type. Similarly, the higher rate of the calculations may also increase overall power consumption for each iteration of the algorithm. Other compiler options may generate a firmware image that optimizes these tradeoffs differently. For example, unnecessary components or sub-circuits may be bypassed or deactivated for computations that do not require them in order to reduce power consumption. Hardware circuits may be configured with redundant subcomponents that support parallel or serial processing and/or highly specialized circuits for data conversion, analysis, compression, model training, model application, etc. and these circuits may be utilized, bypassed, or otherwise reconfigured by different firmware images to support different sets of compute and storage performance considerations and corresponding QoS for each storage device and/or the system as a whole. In some configurations, compute firmware library 106.3 may be a resource that is accessed by storage devices 120 when a new firmware image is needed and/or offloaded to a master storage device and/or individual storage devices to enable the storage devise to more rapidly and dynamically update the firmware for their compute hardware circuits.

In some embodiments, data storage system 100 includes one or more processors, one or more types of memory, a display and/or other user interface components such as a keyboard, a touch screen display, a mouse, a track-pad, and/or any number of supplemental devices to add functionality. In some embodiments, data storage system 100 does not have a display and other user interface components.

Figure 2:
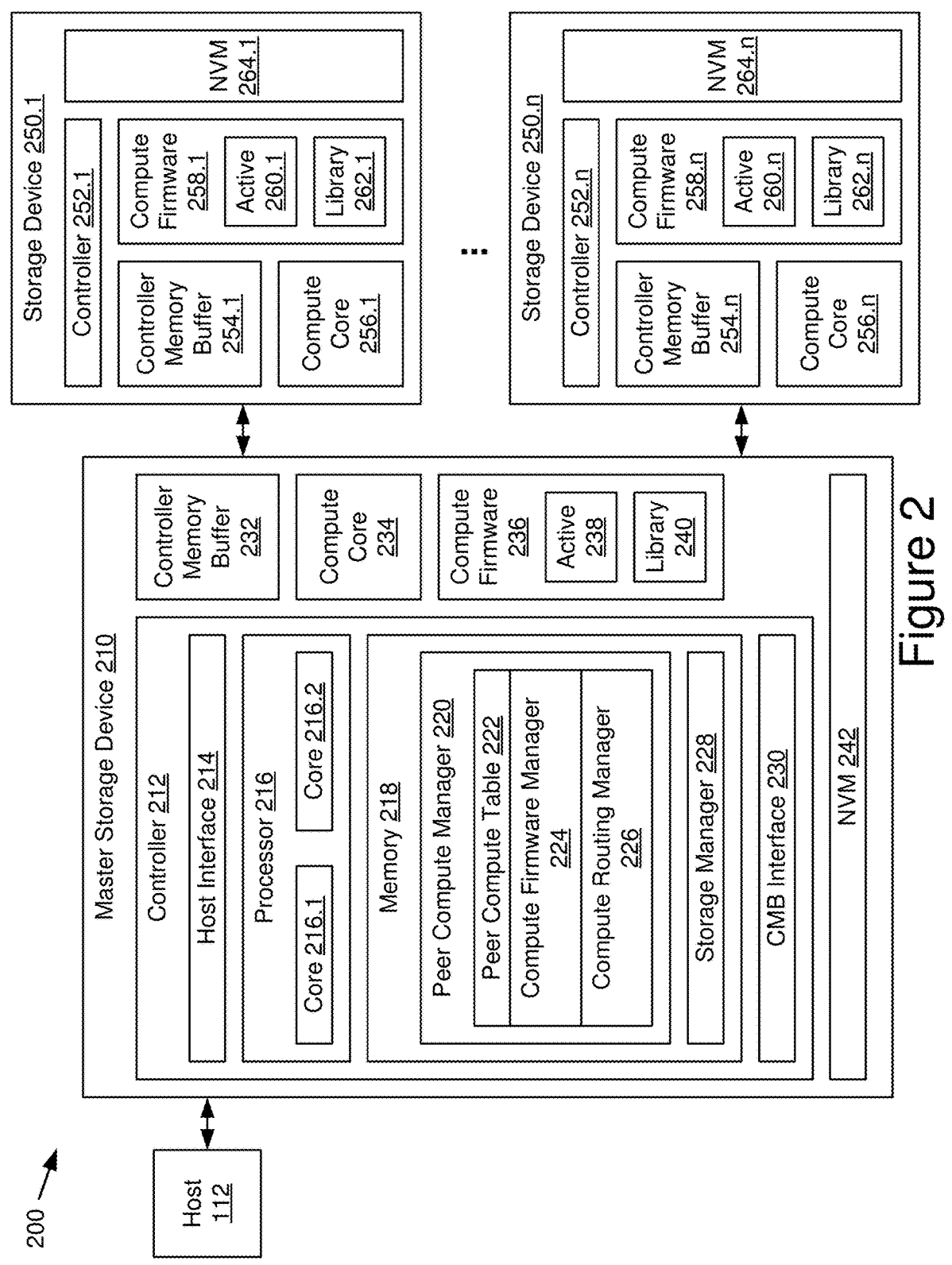
FIG. 2 schematically illustrates an example storage system architecture including a master storage device and its interaction with multiple peer storage devices for peer compute configuration management.

FIG. 2 shows a schematic representation of an example storage system architecture 200 for a master storage device 210 managing compute operations to peer storage devices 250.1-250.n on behalf of host 112. In some configurations, system architecture 200 may be applied to a storage system configured like storage system 100 in FIG. 1. In another configuration, system architecture 200 may be used by a host system 112 with a storage bus or network interface to master storage device 210 through host interface 214 and master storage device 210 may include a storage bus or network interface connection with peer storage devices 250.1-250.n.

For example, each storage device may by interconnected to a common PCIe root complex that supports NVMe and RDMA communication among the storage devices. In some configurations, peer communication among storage devices may use CMB interface 230 to enable commands or messages from master storage device 210 to be written directly to command queues in controller memory buffers 254.1-254.n in their respective storage devices. Similarly, host data to support host storage and compute commands and/or firmware images to support reconfiguration of compute cores 256.1-356.n may be supported by directly copying that data to the CMBs of the target peer storage devices.

In some configurations, master storage device 210 may interact with multiple peer storage devices 250 for peer compute configuration management. Master storage device 210 may include a controller 212, a host interface 214, a processor 216, a memory 218, and CMB interface 230. Memory 218 may instantiate various managers, such as the peer compute manager 220, including compute firmware manager 224 and compute routing manager 226, and storage manager 228. The purpose of master storage device 210 may be to manage and route data to multiple peer storage devices based on computational requirements, optimizing data movement and computation performance within the storage system.

Master storage device 210 may serve as the central hub for managing the compute operations and firmware configurations of the peer storage devices. Controller 212 of the master storage device 210 may facilitate communication between the host system and the peer storage devices, as well as manage the internal operations of the master storage device itself. In some configurations, controller 212 may be instantiated in the device controller of a data storage device, such as device controllers 130 of storage devices 120 in FIG. 1. Processor 216, which may include a first core 216.1 and a second core 216.2, may execute various compute and storage management functions. In some configurations, the first core 216.1 may be dedicated to compute management functions (executing peer compute manager 220), while the second core 216.2 may handle storage operations and other internal data storage and maintenance tasks of master storage device 210.

Memory 218 of master storage device 210 may store executable instructions for peer compute manager 220 and storage manager 228, as well as data structures and firmware images that are used in the management of peer storage devices. Within memory 218, peer compute manager 220 may maintain a peer compute management table 222 that tracks the compute capabilities and current firmware configurations of each peer storage device. Compute firmware manager 224 may manage a library of firmware images and handle the selection and distribution of firmware updates to the peer storage devices, particularly related to configuring their respective compute cores 256. Compute routing manager 226 may determine the routing of compute operations to the appropriate peer storage device based on the current configurations and capabilities of the peer storage devices. Lastly, the storage manager 228 may oversee the storage operations within the master storage device 210, ensuring that data is stored and retrieved from its non-volatile storage media, such as NVM 242.

Master storage device 210 may itself be a peer storage device with host data storage and host compute operation capabilities. Storage manager 228 may manage host input and output operations based on host storage commands received through host interface 214 for host data to be written to or read from NVM 242. Master storage device 210 may include a controller memory buffer 232, a compute core 234, and compute firmware 236 to support compute operations executed by master storage device 210 (as opposed to compute operations forwarded to other peer storage devices, such as peer storage device 250.1-250.n). Controller memory buffer 232 may include remotely addressable buffer memory that may be accessed by host 112 and/or peer storage devices to facilitate efficient transfer of host data and host commands. In some configurations, controller memory buffer 232 may be used to both receive host commands and host data for execution by master storage device 210 and host commands and host data to be selectively allocated to other peer storage devices. Controller memory buffer 232 may also support data transfer related to compute operations, including the distribution of compute commands or compute operations related to those compute commands among peer storage devices, management of intermediate results, and/or transfer of transformed data to another storage location. Controller memory buffer 232 may be used to support transfer of administrative commands, such as indicators of firmware updates, and may be used to transfer copies of firmware images between peer storage devices.

Master storage device 201 may include a compute core 234 supported by compute firmware 236. For example, compute core 234 may comprise a compute hardware circuit that supports multiple configurations based on the firmware image it is loaded with. Compute firmware 236 may include an active or current firmware image 236 that is currently in executable form running on compute core 234. In some configurations, master storage device 210 may include a firmware image library of possible firmware images representing different configurations for compute core 234. Like the other peer storage devices, compute firmware manager 224 may initiate changes to the active firmware image by selecting a different firmware image from firmware image library 240 for a next operating period.

Peer storage devices 250.1-250.n may include controllers 252.1-252.n, controller memory buffers 254.1-254.n, compute cores 256.1-256.n, compute firmware 258.1-258.n (including active firmware 260.1-260.n and firmware image libraries 262.1-262.n), and NVM 264.1-264.n. The purpose of these peer storage devices may be to execute compute operations and store host data, while being dynamically configurable in terms of firmware to optimize performance for specific computational tasks.

Each peer storage device, such as the first peer storage device 250.1 and the nth peer storage device 250.n, may include a controller 252.1-252.n that orchestrates the operations of the storage device, including communication with the master storage device 210 and the execution of compute and storage operations. Controller memory buffers 254.1-254.n may serve as a staging area for data and commands, facilitating efficient data transfer and command execution for host storage and compute commands, as well as administrative commands, from master storage device 210. Compute cores 256.1-256.n may be specialized hardware circuits capable of performing a variety of compute operations on the host data stored within the peer storage devices. These compute cores may be reconfigurable by loading different firmware images from the compute firmware 258.1-258.n, which may include a selection of firmware images tailored for different computational requirements. Active or current firmware 260.1-260.n represents the currently loaded firmware image that dictates the operational behavior of the compute cores. Firmware libraries 262.1-262.n may store multiple firmware images, allowing for the selection and loading of an appropriate firmware image to reconfigure the compute core for a specific task or to optimize performance metrics such as power consumption, memory usage, or input/output efficiency.

Referring to FIGS. 3 and 4, in some embodiments, master storage device 210 may maintain a peer compute management table 300 and a firmware image library metadata table 400. The table structures, fields, and values shown in each entry are examples only and other combinations of fields, different metrics, and entirely different data structures for organizing this information is possible. For example, a series of configuration pages, comma separated values, markup documents, or a multidimensional array of values could provide similar function for organizing configuration information about each storage device in the peer group and/or each firmware image index in one or more firmware image libraries. In some configurations, these tables may be stored only on the master storage device. In other configurations, it may be replicated among one or more other storage devices and/or offloaded to a host system or intermediate device for redundant storage and/or reference by those systems. In some configurations, each storage device may maintain a smaller version of firmware image library metadata table 400 limited to entries comparable with their specific hardware circuits and/or corresponding to firmware images stored within their non-volatile memory.

Peer compute management table 300 may track the compute capabilities and current firmware configurations of each peer storage device and its respective compute core or cores. Each row in the peer compute management table 300 may represent a peer device entry, such as peer device entry 1 330.1, peer device entry 2 330.2, peer device entry 3 330.3, and peer device entry n 330.n. Each entry may include a storage device identifier 310, a master indicator 312, a hardware circuit identifier 314, a hardware circuit type 316, a current firmware index 318, and performance metrics (memory/input-output/power) 320 for that configuration. Storage device identifier 310 may uniquely identify each peer storage device. Master indicator 312 may indicate whether the storage device is a master storage device. Hardware circuit identifier 314 may uniquely identify the hardware circuit within the storage device. Hardware circuit type 316 may identify the type of hardware circuit, such as a GPU, MPE, or FPGA. Current firmware index 318 may identify the current firmware image loaded on the hardware circuit. The performance metrics may include memory usage, input/output operations per unit time, and power consumption for the current firmware configuration.

Firmware image library metadata 400 may include rows for firmware image entries, such as firmware image entry 1 430.1, firmware image entry 2 430.2, firmware image entry 3 430.3, and firmware image entry n 440.n. Each entry may detail a firmware index 410, a circuit type 412, a configuration identifier 414, an operation type 416, a memory metric 418, an input/output metric 420, and a power metric 422. Firmware index 410 may uniquely identify each firmware image. Circuit type 412 may identify the type of hardware circuit that the firmware image is compatible with. Configuration identifier 414 may identify the specific configuration of the hardware circuit that the firmware image is designed for. Operation type 416 may identify the type of computation that the firmware image is optimized for or supports. Memory metric 418 may correspond to the amount of memory used by the configuration and may be expressed in relative (e.g., high, medium, low) or absolute values (minimum or maximum byte bit/byte allocation). Input/output metric 420 may correspond to the operational capacity of the configuration and may be expressed in relative (high, medium, low) or absolute values (input/output operations per second (IOPS) or calculations per second or other time unit). Power metric 422 may correspond to the amount of power consumed by the configuration and may be expressed in relative (e.g., high, medium, low) or absolute value (peak power, average power, power per unit time). Other metrics for measuring and balancing performance trade-offs of the various firmware image configurations are possible.

In some cases, master storage device 210 may use peer compute management table 300 and/or firmware image library metadata table 400 to manage the compute operations and firmware configurations of the peer storage devices. For example, master storage device 210 may determine a target peer storage device from peer compute management table 300 based on the computational requirements of a compute operation. Master storage device 210 may then determine the current firmware image for the hardware circuit of the target peer storage device and compare it to other configurations from firmware image library metadata table 400 based on the operation type and performance metrics. Master storage device 210 may compare the performance of a current configuration (indicated in table 300) with the performance of a different configuration compatible with the hardware circuit in the storage device (indicated in table 400) to determine whether the configuration should be updated. If so, master storage device 210 may send an indication of the new firmware image to the target peer storage device, which may include a firmware index for the first firmware image. The target peer storage device may then load the new firmware image for the hardware circuit from its firmware image library (based on its copy of firmware image library metadata table 400) and reboot the hardware circuit to configure the hardware circuit with the new firmware image.

In some cases, master storage device 210 may dynamically reconfigure some peer storage devices with a different expertise and update its peer compute management table 300 accordingly. For example, master storage device 210 may determine a new firmware image for the hardware circuit of a peer storage device based on a change in the computational workload. Master storage device 210 may then send an indication of the new firmware image to the peer storage device, which may load the new firmware image for the hardware circuit and reboot the hardware circuit to configure the hardware circuit with the new firmware image. Master storage device 210 may update the current firmware index 318 and the metrics 320 for the peer storage device in the peer compute management table 300 to reflect the new firmware configuration.

Figure 5:
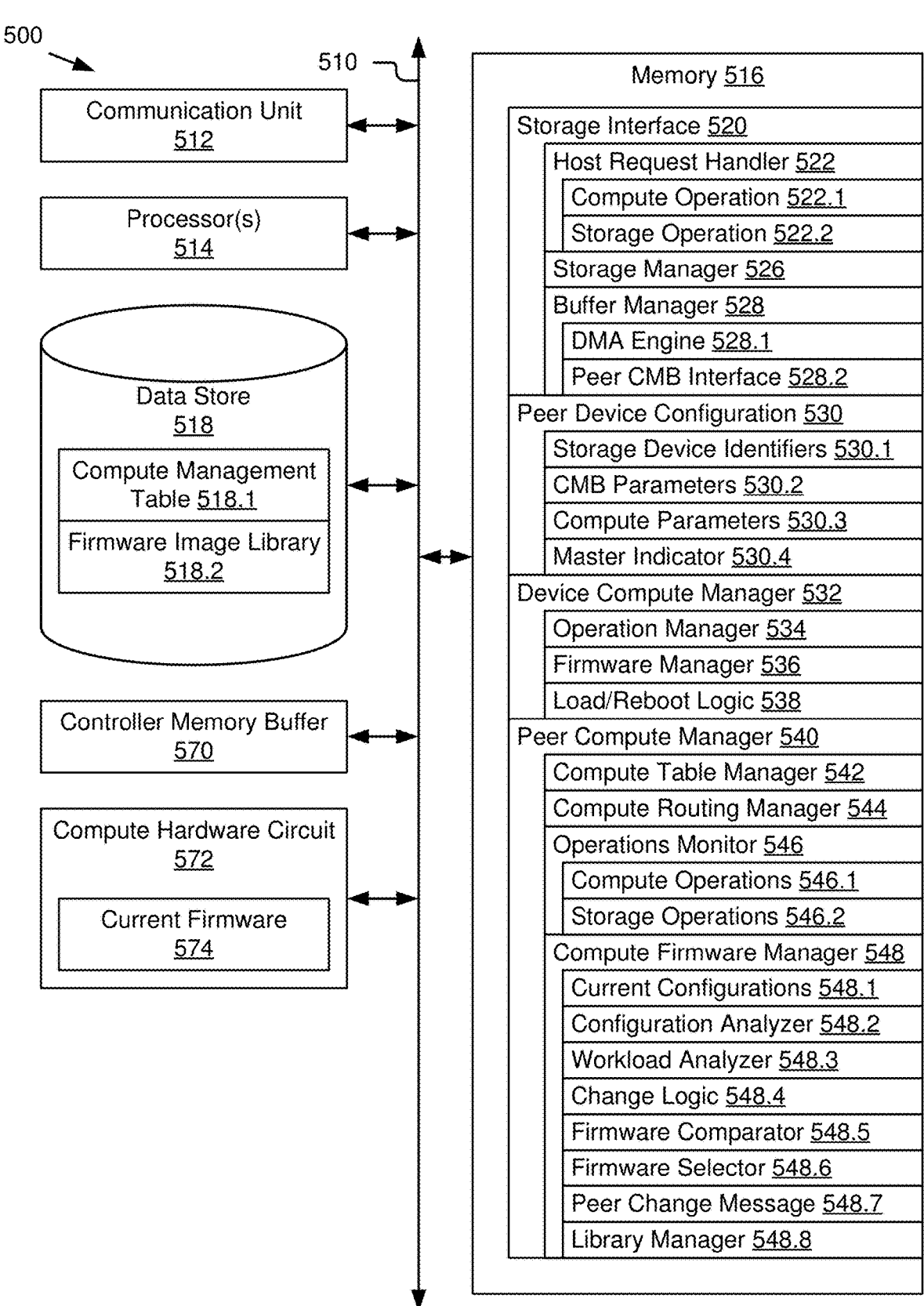
FIG. 5 schematically illustrates a block diagram of a data storage device configured for peer configuration of compute hardware circuit firmware.

FIG. 5 schematically shows selected modules of an example storage device and includes functions of both peer storage devices and a peer storage device designated as master storage device. Storage device 500 may incorporate elements and configurations similar to those shown in FIGS. 1-4. Each peer storage device may include storage interface 520, peer device configuration 528, and/or device compute manager 532 for managing host storage and compute operations, as well as compute configuration updates. One or more storage devices may include peer compute manager 540 for acting as a master storage device for managing compute configuration and operations. Each storage device may include their own communication unit 512, processors 514, memory 516, controller memory buffer 570, compute hardware circuit 572, and data store 518 (which may include storage in NVM devices for host or administrative data), while compute management table 518.1 and firmware image library 518.2 may represent one or more individual, distributed, and/or collective data stores for storing and managing compute management data and firmware.

Storage device 500 may include a bus 510 interconnecting at least one communication unit 512, at least one processor 514, and at least one memory 516. Bus 510 may include one or more conductors that permit communication among the components of storage device 500. Communication unit 512 may include any transceiver-like mechanism that enables storage device 500 to communicate with other devices and/or systems. For example, communication unit 512 may include wired or wireless mechanisms for communicating with other storage devices, host systems, and/or intermediate storage controllers or storage interfaces. In some embodiments, communication unit 512 may include one or more ports and corresponding interface standards (e.g., PCIe, ethernet, etc.) to enable communication among fabric nodes in a storage network fabric.

Processor 514 may include any type of processor or microprocessor that interprets and executes instructions and may include one or more processing units or processor cores. In some configurations, the one or more processors are shared by one or more components within, and in some cases, beyond the function of the device controllers for storage device 500 and may include one or more compute cores that contribute to compute hardware circuit 572. In some configurations, multiple processors or processor cores may operate alone or in combination to execute the functions of storage device 500. In some configurations, one or more cores may be allocated to specific functions. For example, a first set of one or more processor cores may be allocated normal storage operations, such as storage interface 520, peer device configuration, and device compute manager 532, a second set of one or more processor cores may be part of compute hardware circuit 572, and a third set of cores (in the master storage device) may be allocated to peer compute manager 540. In some configurations, a storage device that includes additional processor cores (relative to other storage devices in the peer group) may be selected or configured as the master storage device to support the additional functions of peer compute manager 540. In some configurations, compute hardware circuit 572 may include one or more processor circuits or processor cores that includes specialized hardware for host compute functions that process host data. For example, compute hardware circuit 572 may include a field programmable gate array circuit, a graphics processor unit circuit, a media processing engine circuit, or a neural processing unit circuit.

Memory 516 may include a random access memory (RAM) or another type of dynamic storage device that stores information and instructions for execution by processor 514 and/or a read only memory (ROM) or another type of static storage device that stores static information and instructions for use by processor 514 and/or any suitable storage element such as a hard disk or a solid state storage element. For example, memory 516 may include a combination of dynamic operating memory for loading and executing storage device firmware and static instruction memory for storage device firmware and reference data, including one or more firmware images for compute hardware circuit 572 and the contents of data store 518. In some instances, memory 516 may be distinguished from the non-volatile storage media allocated to storing host data (even though the same media devices may be used for portions of administrative data and firmware images-such as in a reserved administrative area of those media devices).

Storage device 500 may include a plurality of modules or subsystems that are stored and/or instantiated in memory 516 for execution by processor 514. For example, memory 516 may include a storage interface 520 configured to receive, process, and respond to data requests and/or data operation or function commands from host systems or other components of the storage system, including a master storage device. Memory 516 may include a peer device configuration 528 configured to receive, manage, and store parameters related to peer storage devices in one or more peer groups that may directly access memory or storage resources between peer storage devices in the peer group. Memory 516 may include a device compute manager 532 for processing compute tasks related to data operations or functions received from a host system, such as performing a compute tasks or operations assigned by a master storage device. Memory 516 may include a peer compute manager 546 for coordinating compute processing among a plurality of peer storage devices, such as directing compute commands or operations among the peer storage devices and/or managing the compute firmware configurations of the peer storage devices to support host storage and compute QoS.

Storage interface 520 may include interfaces, functions, data structures, and/or parameters for storing, reading, and otherwise managing data requests for host data. For example, storage interface 520 may include functions for reading, writing, modifying, or otherwise manipulating data blocks, objects, and/or files, as well as their respective client or host data and metadata in accordance with the protocols of a block, object, or file storage system. In some embodiments, storage interface 520 may further enable execution of compute operations for selectively transforming, extracting, or otherwise using host data to generate additional data or parameters. For example, storage interface 520 may include protocols and/or interfaces for receiving data function requests or compute commands that may include defining functions, target data sets, and/or result formatting and delivery, as well as executing those functions against host data.

In some embodiments, storage interface 520 may include a plurality of hardware and/or software modules configured to use processor 514 and memory 516 to handle or manage defined operations of storage interface 520. For example, storage interface 520 may include a host request handler 522, a storage manager 526, and a buffer manager 528. For any given host request, storage interface 520 may receive a client request through host request handler 522 and determine one or more operations based on the content of the request. For example, host request handler 522 may be configured to receive host commands for both compute operations 522.1 and storage operations 522.2. These operations may include metadata operations handled by metadata manager 524, data operations handled by storage manager 526, and data processing operations handled by storage interface 520 by calling (or incorporating) one or more other modules, such as device compute manager 532. The results of these operations may be processed, formatted, and returned by host request handler 522.

Host request handler 522 may include an interface, such as a set of command queues, and corresponding logic for receiving data requests and/or operational commands from one or more hosts (directly or through a master storage device). For example, host systems may send a storage or compute command over a network connection and addressed to storage device 500 or a port or logical designation thereof. Host request handler 522 may receive these requests and parse them according to the appropriate communication and storage protocols. Storage commands may be parsed by host request handler 522 into one or more storage operations 522.2 for accessing NVM storage locations for host data in storage device 500. In some configurations, host request handler 522 may be configured for managing data compute operations to be executed by storage device 500. For example, a host system may be able to define one or more data functions to be executed against a data set stored in NVM storage locations without transferring the data set to the host system (i.e., executing the host function on the data in the storage nodes and only transferring the results to the client system). In some embodiments, data previously stored in NVM storage locations may be processed through at least one function (in a set of functions) by storage device 500 using compute hardware circuit 572.

Storage manager 526 may include logic for reading, writing, and deleting data units in NVM storage locations. For example, storage commands may be configured to write, read, modify, and/or delete data units in NVM storage locations. Storage manager 526 may oversee writing and reading data elements that are erasure encoded on the storage medium of the storage devices and may manage logical to physical mapping for the NVM storage locations in an FTL. Storage manager 526 may also manage garbage collection to recover storage locations, such as erase blocks or pages, that have been invalidated through modification or deletion. Storage manager 526 may manage other maintenance and data management operations, such as background wear-levelling, media scan, and other administrative operations.

Buffer manager 528 may include logic for managing one or more buffer memories within storage device 500, including access to those buffer memories by host systems and peer storage devices. Buffer manager 528 may also include logic for accessing buffer memories in peer storage devices. For example, each storage device may include controller memory buffer 570 configured for receiving command messages and related data for storage operations and command operations. Controller memory buffer 570 may include or be allocated in one or more volatile memory devices and configured as a remotely accessible buffer memory that may be read and/or written to by devices external to storage device 500 and not directly connected to bus 510. Buffer manager 530 may be configured to manage both access to controller memory buffer 570 and access to the CMBs of peer storage devices. In some embodiments, buffer manager 530 may be configured to enable direct memory access to the buffer memory locations and to directly access the buffer memory locations of other storage devices. For example, buffer manager 530 may include a hardware and/or software direct memory access (DMA) engine 528.1. DMA engine 528.1 may include logic for providing direct memory access to CMBs using a defined DMA protocol, such as remote direct memory access (RDMA). RDMA protocols may enable data movement directly between fabric nodes, such as peer storage devices, without higher-level data routing. RDMA protocols may be employed over fabric networks using Ethernet, fibre channel, PCIe, and similar interface technologies to enable DMA engine 532 to expose, allocate, and manage selective access to the buffer memory within a given storage device from fabric nodes outside of the storage device, such as peer storage devices. In some embodiments, DMA engine 532 may incorporate iWARP, RDMA over converged Ethernet (RoCE), or other RDMA standards. In some embodiments, buffer manager 530 may be configured to use buffer memory for transferring firmware image indicators, such as a firmware index, as part of a compute configuration update command through an administrative command queue, and/or a firmware image using data transfer buffer allocations, configurations and data among peer storage devices for sharing compute tasks. Peer CMB interface 528.2 may include logic for accessing the CMBs of peer storage devices and may be primarily used by the master storage device to pass commands, host data, function intermediates, and firmware images to target peer storage devices. In some configurations, peer CMB interface 528.2 may be used be target peer storage devices to return compute results and/or host data (including read data or transformed host data) to the CMB of the master storage device.

Peer device configuration 530 may include interfaces, functions, parameters, and/or data structures for receiving, storing, and otherwise managing configuration parameters for peer storage devices. For example, peer device configuration 528 may include a configuration file, table, log, or other data structure for listing each peer storage device in a peer group, such as the peer storage devices participating in a common namespace or other logical grouping configured for peer-to-peer data exchange. In some embodiments, a group of NVMe configured SSDs in the same PCIe root complex may be configured statically or dynamically (e.g., using discovery protocols and controllers) with peer storage device identifiers 530.1 (such as subsystem names, ports, and other NVMe addressing information) and related CMB parameters 530.2 for directly accessing one or more direct memory access memory buffers, such as controller memory buffer 570. A peer group may include any configuration of storage devices with direct memory access to at least one buffer memory within another storage device in the peer group. In some configurations, peer device configuration 530 may include compute configuration parameters 530.3 for managing compute configurations for compute hardware circuit 372. For example, each storage device may include a configuration page for its compute hardware circuit. In some configurations, a master storage device may include a larger set of compute configuration parameters 530.3 corresponding to the compute configurations of all of the peer storage devices. For example, peer device configuration 530 may include or access compute management table 518.1 and/or the functions of compute table manager 542. In some configurations, a master indicator 530.4 in peer device configuration 530 may identify the master storage device to each peer storage device.

Device compute manager 532 may include interfaces, functions, parameters, and/or data structures for executing an assigned compute task that contributes to processing a host function request or compute commands within the storage device without moving the input data back to the requesting host. For example, device compute manager 536 may include operation manager 534 comprised of logic to identify target input data units, such as input data in controller memory buffer 570 of another peer storage device, stored in a local storage medium or buffer memory of the assigned storage device, or elsewhere and then process the input data through one or more data functions using compute hardware circuit 572. In some embodiments, device compute manager 532 may be implemented in each peer storage device to enable local processing of locally stored data units and/or data units that can be accessed through direct memory access to peer storage devices or data units destined to be stored in the storage medium of the storage device (as received or as transformed by the data function). Operation manager 534 may use a current configuration of compute hardware circuit 572, based on a current firmware image 574, to process compute commands and/or a compute portion of storage commands received from the host system (directly or as directed by the master storage device). Host data processing functions may include data functions that operate on stored host data regardless of physical storage location, encoding, redundancy, encryption, and storage management functions used by the storage system to manage data storage. For example, user data processing functions may include data transformations, extractions, abstractions, feature identification, model training, model processing, and other processes to support client application processing of data for applications like data analysis, artificial intelligence training/use, image processing, pattern recognition, etc. Specific data processing functions may be grouped into different compute operation types and mapped to hardware circuit types that can support the compute resources for those data processing functions. For example, GPU and MPE circuit types may be mapped to media encoding or data transformation operation types and GPU and NPU may be mapped to machine learning operation types.

Device compute manager 532 may also be configured to respond to firmware updates to change the configuration of compute hardware circuit 572. For example, device compute manager 532 may include a firmware manager 536 that includes logic for identifying, loading, and updating the firmware image for a selected firmware configuration for compute hardware circuit 572. Firmware manager 536 may include or point to current firmware image 574 to be loaded and used at runtime when compute hardware circuit 572 is initialized, generally during startup of storage device 500. Further, firmware manager 536 may respond to firmware update commands received from the master storage device to change the firmware configuration of compute hardware circuit 572. For example, firmware manager 536 may receive an administrative command received through host request handler 522, such as a firmware update command received in an administrative command queue in controller memory buffer 570 indicating that the firmware image for compute hardware circuit 572 should be changed to better support a different compute function type and/or optimization for one or more performance metrics. Firmware manager 536 may use the firmware indicator, such as a firmware index value, to identify the firmware image that should be used to update compute hardware circuit 572. In some configurations, firmware manager 536 may use the firmware index value to search a firmware image library 518.2 for compute hardware circuit 572 stored in the data store 518. For example, firmware manager 536 may include a firmware image library metadata table that includes the firmware index values and corresponding storage locations for each different firmware image configuration available for compute hardware circuit 572. In some configurations, firmware manager 536 may determine (because it does not contain a firmware image library for compute hardware circuit 572 or because the firmware index value does not appear in the metadata table) that the firmware image needs to be retrieved from another source. For example, firmware manager 536 may check a command parameter in the firmware update command indicating a data transfer location in CMB 570 for receiving the new firmware image from the master storage device. In some configurations, firmware manager 536 may be configured to access or search for firmware images based on the firmware index in other accessible firmware libraries, such as a host storage driver, a storage controller or interface firmware repository, or a network firmware repository.

Once firmware manager 536 has successfully accessed or transferred the new firmware image for compute hardware circuit 572, it may initiate load/reboot logic 538 to activate the new firmware image as the current firmware for a next operating period. For example, firmware manager 536 may update the storage location or pointer for current firmware 574 in operation manager 534 to indicate the new firmware image and reboot the compute hardware circuit to load the new firmware image when the circuit power cycles. In some configurations, a complete reboot of storage device 500 may be necessary to fully install the new firmware image and load/reboot logic 538 may be configured to initiate a storage device reboot in order to reboot compute hardware circuit. Other selective subsystem reboots to initialize the new firmware may also be possible.

Peer compute manager 540 may include interfaces, functions, parameters, and/or data structures for managing compute operations across a set of peer storage devices. In some configurations, peer compute manager 540 may be instantiated in a master storage device selected from among the peer storage devices and configured for peer communication, such as using controller memory buffer 570 and buffer manager 528. Peer compute manager 540 may be configured to maintain configuration information for the compute capabilities of all of the peer storage devices. For example, peer compute manager 540 may include compute table manager 542 configured to manage a peer compute management data structure, such as compute management table 518.1 to collect compute configuration information for the compute hardware circuits of the peer storage devices. Compute table manager 542 may include logic for receiving or querying configuration parameters of compute hardware circuits present (if any) in each peer storage device, generating entries in compute management table 518.1 for each storage device and/or compute hardware circuit. An example compute management table 300 with corresponding fields is shown in FIG. 3. Compute table manager 542 may include logic for determining one or more performance parameters for the compute configurations of each storage device to assist in routing storage and compute commands and reconfiguring compute configurations to support changing host processing needs.

In some configurations, peer compute manager 540 may include compute routing manager 544 configured to rout host storage and compute commands and/or compute operations and/or storage operations based on those commands to peer storage devices (and may include the master storage device among the peer storage devices for routing). For example, compute routing manager 544 may include logic to implement a routing policy to distribute and load balance host data storage and related compute function processing among the peer storage devices. In a heterogeneous set of peer storage devices, different storage devices may include different storage and compute configurations. For example, different storage devices may include different compute hardware circuits, such as different types of compute cores. Further, those compute hardware circuits may be initialized in a default firmware configuration and/or optimized for different operation types by their current firmware image. Compute routing manager 544 may receive and analyze host commands individually, in a pending queue, and/or based on historic usage patterns, to determine a best target storage device for the processing of each command and/or sub-operations for that command if the command can be broken down and distributed in smaller storage and/or compute operations. An example compute routing policy may prioritize allocation of host commands to storage devices with a compute hardware circuit matched to the compute operation type and use other factors, such as available storage, queue depth, processing lag, backend overhead (such as pending garbage collection or high error rates), to balance among the prioritized compute capabilities of the different storage device configurations.

In some configurations, peer compute manager 540 may include an operations monitor 546 configured to monitor the operations distributed among the peer storage devices to support compute routing decisions and conditions for reconfiguring the compute configuration of one or more storage devices. For example, operations monitor 546 may include logic to collect operating parameters for the operations allocated to peer storage devices, such as queue depths, processing times, lag, operations per unit time, capacity used and rate of use, invalid blocks, errors, etc. In some configurations, operations monitor 546 may monitor both compute operations 546.1 to determine processing time (from operation allocation to the return of compute operation results) and storage operations 546.2 to determine storage usage and alignment between data storage and resources for processing that using the compute functions. Operating parameters from operations monitor 546 may be used by compute routing manager 544 to select target storage devices for each host command processed and may be used by compute firmware manager 548 to determine whether and when to update the firmware configuration of one or more storage devices.

Peer compute manager 540 may include a compute firmware manager 548 configured to analyze the current operations of individual storage devices and the peer group as a whole and determine configuration changes that would improve performance relative to the workload and QoS expectations of the host systems. Current configurations 548.1 may store information about the existing firmware settings of the compute hardware circuits within the storage devices, allowing for a baseline assessment of performance. For example, current configurations 548.1 may analyze the parameters in compute management table 518.1 to determine various characteristics of the current configurations of specific storage devices and the peer group.

Configuration analyzer 548.2 may examine these settings in the context of current operations to identify potential bottlenecks or inefficiencies. Configuration analyzer 548.2 may apply one or more capacity models for determining one or more capacity values for individual storage devices and the peer group in aggregate. For example, configuration analyzer 548.2 may calculate a number of operations per unit time of each operation type that may be handled by the current configurations to provide a capacity metric for the current configurations. In some configurations, configuration analyzer 548.2 may use machine learning algorithms to predict the impact of different firmware settings on performance metrics.

Workload analyzer 548.3 may monitor the actual compute and storage workload being processed by the storage devices, providing real-time data that can be used to make informed decisions about firmware reconfigurations. For example, workload analyzer 548.3 may use the aggregate operating data from operations monitor 546 to generate one or more workload values representing a current volume of compute operations being processed by the storage devices. In some configurations, workload analyzer 548.3 may apply one or more models to current and/or historical operating data to characterize and predict the workload values in terms of compute operation types and volumes over time and any usage patterns that may emerge. In some configurations, workload analyzer 548.3 may use machine learning algorithms to identify the workload patterns and corresponding workload values.

Change logic 548.4 may use capacity values, workload values, and comparisons thereof to propose specific changes to firmware settings that are likely to yield performance improvements. For example, change logic 548.4 may determine conditions for triggering firmware changes and/or analysis of possible firmware changes to determine whether a firmware configuration change would improve performance. In some configurations, change logic 548.4 may include one or more threshold values based on capacity values, workload values, and/or differences between capacity and workload values to determine when a configuration change threshold is met and alternative configurations of the peer storage devices should be evaluated. In some configurations, change logic 548.4 may evaluate the proposed changes in order to select one or more compute firmware configuration changes to improve performance. In some configurations, change logic 484.4 may evaluate a variety of performance metrics that may correspond to QoS metrics, such as memory use, operations per unit time, power consumption, device wear or write amplification, and other performance metrics which may be evaluated based on corresponding storage device capacity, workload comparison, and/or absolute thresholds (such as maintaining system power usage below a certain threshold value).

Firmware comparator 548.5 may compare the current firmware configurations with a repository of known configurations and their performance outcomes, identifying the closest matches to the desired performance characteristics. In some configurations, a single storage device may be analyzed versus the various possible firmware configurations for its compute hardware circuit to determine a best performing configuration for that storage device. In other configurations, various combinations of changes across multiple storage devices may be compared to determine aggregate improvements in performance. Firmware selector 548.6 may then choose the optimum firmware image from the firmware image library 518.2 based on the recommendations of the firmware comparator 548.5. Firmware selector 548.6 may determine the storage device(s), compute hardware circuit(s), and specific firmware images to achieve the desired performance improvement. For example, one or more storage devices and their corresponding compute hardware circuits may be selected from compute management table 518.1 and a firmware index value corresponding to the new firmware images for the improved configurations may be selected from a firmware image library metadata table.

Peer change message logic 548.7 may generate communication protocols to inform the affected storage devices of the impending firmware updates. For example, peer change message logic 548.7 may generate an administrative command to each target peer storage device providing an indicator of the firmware change, such as the new firmware index value of the firmware configuration to be changed to. In some configurations, peer change message logic 548.7 may determine that the new firmware image should be available in a firmware image library available to the target storage device, such as a firmware library stored in its memory. In some configurations, peer change message logic 548.7 may determine that the new firmware image should be sent to the target storage device and peer change message logic 548.7 may copy the firmware image from its one firmware image library 518.2 and transfer it to the target storage device. In some configurations, controller memory buffers and peer CMB interface 528.2 may be used to transfer the firmware image directly to the target storage device. In some configurations, library manager 548.8 may oversee the organization and retrieval of firmware images from the firmware image library 518.2. For example, library manager 548.8 may configure and maintain the firmware image library metadata table and use storage location pointers in that table to locate and copy firmware images for use by peer change message logic 548.7 and/or firmware manager 536.

Memory 516 may include additional logic and other resources (not shown) for processing data requests, such as modules for generating, queueing, and otherwise managing object or file data requests. Processing of a data request by storage interface 520 may include any number of intermediate steps that yield at least one data request to the distributed storage system.

FIG. 6 presents a flowchart of method 600, which outlines a process for configuring and managing compute firmware in peer storage devices within a storage system. The method is executed by system components such as master storage devices and peer storage devices, which may include processors, memory, and firmware management logic. The outcome of the method is the dynamic reconfiguration of compute resources among peer storage devices to optimize performance for specific computational tasks. Generally, the method involves configuration operations 602, master storage device operations for determining current firmware configurations and selecting new firmware images, and peer storage device operations for updating the compute circuits within the storage devices to enhance their performance.

At block 610, peer storage devices are configured. For example, an administrator may configure a group of storage devices as a peer group capable of peer communication.

At block 612, a master storage device is configured among the peer storage devices. The administrator may select one of the peer storage devices to be the master storage device, which may involve setting up communication protocols and management structures for overseeing the peer storage devices, and indicate the master storage device to each of the peer storage devices.

At block 614, a peer compute management data structure is stored. For example, the master data storage device may scan or otherwise receive compute configuration parameters from the other peer storage devices to create and/or update a peer compute management table or other data structure with information about the compute capabilities and firmware configurations of each peer storage device.

At block 616, the current firmware configuration of a peer compute circuit is determined. For example, the master storage device may determine the firmware version currently in use by a peer storage device's compute circuit from the peer compute management data structure.

At block 618, a new firmware configuration for the peer compute circuit is determined. For example, the master storage device may determine a different compute configuration would improve performance based on various factors such as workload, performance metrics, or new operational requirements.

At block 620, the location of the new firmware image is determined. For example, the master storage device may locate the appropriate firmware image and firmware index within a firmware library.

At block 622, the new firmware image is determined to be within the peer storage device. For example, the master storage device may determine that the new firmware image is part of a standard firmware library distributed to and stored in the memory of storage devices having that compute hardware.

At block 624, the firmware index for the new firmware image is determined. For example, the master storage device may determine the firmware index that corresponds to the selected firmware image based on the firmware image library metadata.

At block 626, an indicator including the firmware index is sent to the peer storage device. For example, the master storage device may transmit the firmware index to the peer storage device in an administrative command to initiate the firmware update process.

At block 628, the master storage device selects the new firmware image from its firmware library. The master storage device may determine to provide the firmware image because the target peer storage device does not have the firmware image or the master storage device does not know whether it has it.

At block 630, the new firmware image is copied from the firmware library. The master storage device may prepare the firmware image for transmission to the peer storage device.

At block 632, an indicator including the new firmware image is sent to the peer storage device. The master storage device may route the actual firmware image to the peer storage device for installation.

At block 634, the peer storage device receives the indicator of the new firmware image. The peer storage device may receive the transmission of the administrative command that includes the firmware index and/or the firmware image itself (or a pointer to a data transfer buffer location for the firmware image).

At block 636, the new firmware image is loaded for the compute circuit. The peer storage device may update its compute circuit with the received firmware image.

At block 638, the compute circuit is rebooted to configure the compute circuit with the new firmware image. The peer storage device restarting the compute circuit to apply the new firmware settings.

At block 640, compute operations are processed using the new firmware configuration. The peer storage device may execute compute tasks using the updated firmware to achieve improved performance or functionality.

FIG. 7 presents a flowchart of method 700, which outlines a process for managing firmware in compute circuits of a storage device in response to an indication to change firmware. The method is executed by components within the storage device, such as the device controller and firmware management logic. The outcome of the method is the successful update and configuration of the compute circuit with a new firmware image, enhancing the device's performance for compute operations. The method includes storing a firmware image library, configuring a controller memory buffer for peer communication, and processing compute operations using a first compute circuit configuration during a first operating period 702, followed by receiving an indication of a new firmware image, determining a firmware index, identifying the new firmware image in the firmware image library, and loading the new firmware image for the compute circuit to initiate a second operating period 704.

At block 710, a firmware image library is stored within the storage device. For example, the storage device may allocate a section of its non-volatile memory to store various firmware images that can be used to configure its compute circuit.

At block 712, the controller memory buffer is configured to enable peer communication. For instance, the storage device may establish protocols that allow it to receive and send data and commands directly to and from peer storage devices using controller memory buffers in those peer storage devices and direct memory access.

At block 714, compute operations are received in the controller memory buffer. This may involve the storage device's controller memory buffer receiving a set of compute operations from a host system or another storage device into command queues allocated in the controller memory buffer.

At block 716, the compute operations are processed using the first compute circuit configuration. The storage device may utilize its current firmware settings to execute the received compute operations using the compute circuit.

At block 718, an indication of a new firmware image is received in the controller memory buffer. For example, the storage device may receive a command from the master storage device indicating that a new firmware image is available for the compute circuit.

At block 720, a firmware index is determined from the received indication. The storage device may extract the firmware index from the command to identify which firmware image from the library is to be used.

At block 722, the new firmware image is identified in the firmware image library using the firmware index. The storage device may use the firmware index to locate the new firmware image within its stored library of firmware images.

At block 724, the new firmware image is loaded for the compute circuit. The storage device may update the firmware of its compute circuit with the newly identified firmware image to enhance its compute operation capabilities.

FIG. 8 presents a flowchart of method 800, which outlines a process for managing compute circuits of storage devices based on compute operations from a host system. The method is executed by components within a master storage device, which may include processors, memory, and firmware management logic. The outcome of the method is the dynamic reconfiguration of compute resources to optimize the performance of storage devices in response to the computational demands of the host system. The method involves assessing current compute configurations, determining compute workload, comparing it to compute capacity, and implementing firmware changes to improve performance.

At block 810, compute circuits of storage devices are operated in their current configuration. For example, a master storage device may oversee the operation of peer storage devices using their existing firmware settings to handle compute tasks.

At block 812, compute operations are received from the host system. This may involve the master storage device collecting a series of compute tasks from a host system that require processing by the storage devices.

At block 814, the compute workload for the storage devices is determined. For instance, the master storage device may analyze the volume and complexity of the compute tasks to assess the overall workload being placed on the storage devices.

At block 816, compute hardware values for the current configuration are determined. The master storage device may evaluate the performance metrics, such as processing speed and efficiency, of the compute circuits under their current firmware settings.

At block 818, the compute capacity of the current configuration is determined. The master storage device may calculate the maximum compute operations that the storage devices can handle simultaneously based on their current configurations.

At block 820, the compute workload and compute capacity are compared. The master storage device may assess whether the current compute capacity is sufficient to handle the incoming workload effectively.

At block 822, performance metrics for a change threshold are determined. The master storage device may establish benchmarks that, when exceeded, indicate a potential performance issue that could be resolved by reconfiguring the compute circuits.

At block 824, it is assessed whether the change threshold is met. The master storage device may decide if the performance metrics warrant a change in the firmware configuration of the compute circuits.

At block 826, a set of possible firmware changes for the hardware circuits is determined. The master storage device may explore various firmware options that could potentially improve the performance of the compute circuits.

At block 828, these possible firmware changes are evaluated for improving performance metrics for the workload. The master storage device may simulate or predict the outcomes of different firmware configurations to find the one that offers the greatest performance enhancement.

At block 830, a configuration change for the compute circuits is determined. The master storage device may select the firmware configuration that is expected to provide the optimum performance for the current workload.

At block 832, firmware images for the configuration change are selected. The master storage device may choose the specific firmware images from a library that correspond to the new configuration.

At block 834, indicators for the configuration changes are sent to the storage devices. The master storage device may communicate the firmware updates to the peer storage devices, instructing them to implement the new configurations.

FIG. 9 presents a flowchart of method 900, which outlines a process for managing compute operations in a storage system. The method is executed by components within a master storage device and peer storage devices, which may include processors, memory, and firmware management logic. The outcome of the method is the efficient allocation and execution of compute operations across the storage system, ensuring that the computational demands of the host system are met. The method involves master storage device operations 902 for storing current compute configurations, receiving compute commands, selecting appropriate storage devices for executing the commands, and updating compute circuits with new firmware images when additional compute capacity is desired. Target storage device operations 904 execute the compute operations and update the firmware images as requested by the master storage device.

At block 910, current compute circuit configurations of storage devices are stored. For example, the master storage device may maintain a record of the firmware versions and settings for each compute circuit within the peer storage devices.

At block 912, a compute command from the host system is received. This may involve the master storage device collecting a request from a host system that specifies a particular compute operation to be performed.

At block 914, current compute configurations of storage devices are determined. The master storage device may assess the capabilities and current workload of each peer storage device to identify the one that is the ideal candidate for executing the compute command.

At block 916, a storage device is selected to receive the compute command. The master storage device may choose a peer storage device based on its current compute configuration and availability to ensure efficient processing of the compute operation.

At block 918, the compute operation is executed based on the compute command. The selected peer storage device may perform the computation using its compute circuit configured with the current firmware.

At block 920, it is determined if additional compute capacity is desired for the compute command. The master storage device may evaluate whether the current compute resources are sufficient or if there is a benefit to enhancing the compute capabilities of the peer storage devices.

At block 924, a new firmware image for additional compute capacity is selected. The master storage device may identify a firmware image from a library that would increase the compute capacity of a peer storage device's compute circuit.

At block 926, a storage device is selected to receive the configuration change. The master storage device may choose a peer storage device that would benefit from the firmware update to improve its compute performance.

At block 928, an indicator of the new firmware image is sent to the selected storage device. The master storage device may communicate the firmware update to the peer storage device, instructing it to implement the new configuration. The master storage device may return to block 916 and select the storage device with the new configuration to receive the compute command.

At block 930, the selected storage device receives the indicator of the new firmware image. The peer storage device may accept the transmission and prepare to update its compute circuit with the new firmware.

At block 932, the compute circuit is updated with the new firmware image. The peer storage device may load the new firmware onto its compute circuit, thereby enhancing its capacity to handle compute operations. The method may proceed to block 918 to execute compute operations using the updated compute circuit configuration.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of an entirely hardware embodiment, an entirely software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g., through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

What is claimed is:

1. A data storage device, comprising:
a non-volatile storage medium configured to store host data;
at least one storage interface configured for communication with a host system and a plurality of peer storage devices, wherein each peer storage device of the plurality of peer storage devices comprises a hardware circuit configured for compute operations targeting host data in that peer storage device;
at least one processor configured to, alone or in combination:
determine a target peer storage device from the plurality of peer storage devices;
determine a first firmware image for the hardware circuit of the target peer storage device; and
send an indication of the first firmware image to the target peer storage device, wherein the target peer storage device is configured to use, responsive to the indication, the first firmware image to configure the hardware circuit; and
a remotely accessible buffer memory configured for access by the plurality of peer storage devices through the at least one storage interface, wherein:
the plurality of peer storage devices each further comprises a remotely accessible buffer memory configured for access by the at least one processor; and
sending the indication of the first firmware image to the target peer storage device comprises transferring the indication to the remotely accessible buffer memory of the target peer storage device.

2. The data storage device of claim 1, wherein:
the indication of the first firmware image is a firmware index for the first firmware image; and
the target peer storage device is further configured to:
store, prior to receiving the indication, a firmware image library including the first firmware image; and
load, responsive to receiving the indication, the first firmware image for the hardware circuit from the firmware image library.

3. The data storage device of claim 1, wherein:
the indication of the first firmware image comprises a copy of the first firmware image; and
the at least one processor is further configured to, alone or in combination:
determine a desired configuration for the hardware circuit of the target peer storage device;
select the first firmware image corresponding to the desired configuration from a firmware library comprised of a plurality of firmware images for the hardware circuit; and
copy the first firmware image from the firmware library to the remotely accessible buffer memory of the target peer storage device.

4. The data storage device of claim 1, wherein:
the target peer storage device is further configured to operate, prior to receiving the indication of the first firmware image, the hardware circuit using a second firmware image that is different than the first firmware image; and
the at least one processor is further configured to, alone or in combination:
receive, from the host system, a plurality of compute operations targeting host data in the plurality of peer storage devices; and
select, based on the plurality of compute operations, the first firmware image.

5. The data storage device of claim 4, wherein the at least one processor is further configured to, alone or in combination:
determine, based on the plurality of compute operations, a compute workload for the plurality of peer storage devices;
determine, based on current configurations for the hardware circuits of the plurality of peer storage devices, a compute capacity;
determine, based on a comparison of the compute workload and the compute capacity, at least one configuration change for the plurality of peer storage devices; and
send, to the plurality of peer storage devices, at least one firmware image indicator for a firmware change for at least one hardware circuit of the plurality of peer storage devices.

6. The data storage device of claim 5, wherein the at least one processor is further configured to, alone or in combination:
determine, based on the current configurations for the hardware circuits of the plurality of peer storage devices and for each hardware circuit, at least one value selected from:
an operation support type;
a memory usage metric;
an operations per unit time metric; and
a power metric;

determine, for each hardware circuit, a plurality of possible firmware images corresponding to different values for the at least one value; and select, based on the plurality of possible firmware images, the firmware change.

7. The data storage device of claim 1, further comprising:

a peer compute management data structure stored in memory and comprising, for each peer storage device of the plurality of peer storage devices:

a storage device identifier;

at least one hardware circuit identifier;

at least one hardware circuit type; and at least one current firmware index, wherein:

the at least one hardware circuit identifier is configured to uniquely identify at least one hardware circuit configured for compute operations in that peer storage device;

the at least one hardware circuit type is configured to identify among a plurality of hardware circuit types for each at least one hardware circuit identifier; and the at least one current firmware index is configured to identify among a plurality of firmware images for that hardware circuit type.

8. The data storage device of claim 1, wherein the at least one processor is further configured to, alone or in combination:

receive, from the host system, a plurality of compute operations targeting host data in the plurality of peer storage devices; and select, for each compute operation of the plurality of compute operations and based on current configurations of the hardware circuits in the plurality of peer storage devices, a destination peer storage device for executing that compute operation using the hardware circuit of that destination peer storage device.

9. The data storage device of claim 1, wherein the at least one processor comprises:

a first processor core configured to execute compute management functions;

a second processor core configured to execute storage operations to the non-volatile storage medium; and a third processor core configured to execute compute operations related to host data stored in the non-volatile storage medium, wherein the third processor core is at least a portion of a hardware circuit selected from:

a compute accelerator circuit;

a field programmable gate array circuit;

a graphics processing unit circuit;

a media processing engine circuit; and a neural processing unit circuit.

10. The data storage device of claim 1, wherein:

determining the target peer storage device comprises:

determining a current configuration for the hardware circuit of the target peer storage device;

determining a plurality of possible configurations for the hardware circuit of the target peer storage device to perform different compute operations; and determining a change of configuration for the hardware circuit of the target peer storage device for a different compute operation from the current configuration; and the first firmware image for the hardware circuit of the target peer storage device corresponds to the different compute operation.

11. A computer-based method, comprising:

determining, by a master storage device, a target peer storage device from a plurality of peer storage devices, wherein each storage device of the master storage device and the plurality of peer storage devices comprises:

a non-volatile storage medium configured to store host data for a host system;

at least one storage interface configured for communication among the master storage device and the plurality of peer storage devices; and a hardware circuit configured for compute operations targeting host data in that storage device;

receiving, from the host system, a plurality of compute operations targeting host data in the plurality of peer storage devices;

determining, by the master storage device and based on the plurality of compute operations, a first firmware image for the hardware circuit of the target peer storage device;

sending, by the master storage device, an indication of the first firmware image to the target peer storage device;

operating, by the target peer storage device and prior to receiving the indication of the first firmware image, the hardware circuit using a second firmware image that is different than the first firmware image; and loading, by the target peer storage device and responsive to the indication, the first firmware image to configure the hardware circuit with the first firmware image.

12. The computer-based method of claim 11, wherein:

each storage device of the master storage device and the plurality of peer storage devices further comprise a remotely accessible buffer memory configured for access among the master storage device and the plurality of peer storage devices through the at least one storage interface of that storage device; and sending the indication of the first firmware image to the target peer storage device comprises the master storage device transferring the indication to the remotely accessible buffer memory of the target peer storage device.

13. The computer-based method of claim 12, further comprising:

storing, by the target peer storage device and prior to receiving the indication, a firmware image library including the first firmware image; and determining, by the target peer storage device, a firmware index for the first firmware image from the indication of the first firmware image, wherein loading the first firmware image for the hardware circuit comprises loading the first firmware image from the firmware image library.

14. The computer-based method of claim 12, further comprising:

determining, by the master storage device, a desired configuration for the hardware circuit of the target peer storage device;

selecting, by the master storage device, the first firmware image corresponding to the desired configuration from a firmware library comprised of a plurality of firmware images for the hardware circuit; and copying, by the master storage device, the first firmware image from the firmware library to the remotely accessible buffer memory of the target peer storage device, wherein the indication of the first firmware image comprises a copy of the first firmware image.

15. The computer-based method of claim 11, further comprising:

determining, by the master storage device and based on the plurality of compute operations, a compute workload for the plurality of peer storage devices;

determining, by the master storage device and based on current configurations for the hardware circuits of the plurality of peer storage devices, a compute capacity;

determining, by the master storage device and based on a comparison of the compute workload and the compute capacity, at least one configuration change for the plurality of peer storage devices; and sending, by the master storage device and to the plurality of peer storage devices, at least one firmware image indicator for a firmware change for at least one hardware circuit of the plurality of peer storage devices.

16. The computer-based method of claim 15, further comprising:

determining, by the master storage device and based on the current configurations for the hardware circuits of each storage device of the plurality of peer storage devices, at least one value for each hardware circuit, the at least one value selected from:

an operation support type;

a memory usage metric;

an operations per unit time metric; and a power metric;

determining, by the master storage device and for each hardware circuit, a plurality of possible firmware images corresponding to different values for the at least one value; and selecting, by the master storage device and based on the plurality of possible firmware images, the firmware change.

17. The computer-based method of claim 11, further comprising:

storing, by the master storage device, a peer compute management data structure comprising, for each storage device of the plurality of peer storage devices:

a storage device identifier;

at least one hardware circuit identifier;

at least one hardware circuit type; and at least one current firmware index, wherein:

the at least one hardware circuit identifier is configured to uniquely identify at least one hardware circuit configured for compute operations in that peer storage device;

the at least one hardware circuit type is configured to identify among a plurality of hardware circuit types for each at least one hardware circuit identifier; and the at least one current firmware index is configured to identify among a plurality of firmware images for that hardware circuit type.

18. The computer-based method of claim 17, further comprising:

selecting, for each compute operation of the plurality of compute operations and based on current configurations of the hardware circuits in the plurality of peer storage devices, a destination peer storage device; and executing, by each destination peer storage device, that compute operation of the plurality of compute operations using the hardware circuit of that destination peer storage device.

19. The computer-based method of claim 11, wherein:

determining the target peer storage device comprises:

determining a current configuration for the hardware circuit of the target peer storage device;

determining a plurality of possible configurations for the hardware circuit of the target peer storage device to perform different compute operations; and determining a change of configuration for the hardware circuit of the target peer storage device for a different compute operation from the current configuration; and the first firmware image for the hardware circuit of the target peer storage device corresponds to the different compute operation.

20. A system, comprising:

a plurality of peer storage devices, wherein each storage device of the plurality of peer storage devices comprises:

a non-volatile storage medium configured to store host data for a host system;

at least one storage interface configured for communication among the plurality of peer storage devices; and a hardware circuit configured for compute operations targeting host data in that storage device;

means for determining, by a master storage device of the plurality of peer storage devices, a target peer storage device from the plurality of peer storage devices;

means for determining, by the master storage device, a first firmware image for the hardware circuit of the target peer storage device;

means for sending, by the master storage device, an indication of the first firmware image to the target peer storage device, wherein the target peer storage device is configured to use, responsive to the indication, the first firmware image to configure the hardware circuit; and means for receiving, from the host system, a plurality of compute operations targeting host data in the plurality of peer storage devices; and means for selecting, for each compute operation of the plurality of compute operations and based on current configurations of the hardware circuits in the plurality of peer storage devices, a destination peer storage device for executing that compute operation using the hardware circuit of that destination peer storage device.

* * * * *